Dec. 13, 1966 N. H. STOCHEL 3,292,156

DATA SIGNAL STORAGE CIRCUIT

Filed May 28, 1963 13 Sheets-Sheet 1

INVENTOR
N. H. STOCHEL
BY
ATTORNEY

DATA SIGNAL STORAGE CIRCUIT

Filed May 28, 1963 13 Sheets-Sheet 2

Dec. 13, 1966 N. H. STOCHEL 3,292,156

DATA SIGNAL STORAGE CIRCUIT

Filed May 28, 1963 13 Sheets-Sheet 3

DATA SIGNAL STORAGE CIRCUIT

Filed May 28, 1963 13 Sheets-Sheet 5

Dec. 13, 1966 N. H. STOCHEL 3,292,156

DATA SIGNAL STORAGE CIRCUIT

Filed May 28, 1963 13 Sheets-Sheet 6

Dec. 13, 1966 N. H. STOCHEL 3,292,156

DATA SIGNAL STORAGE CIRCUIT

Filed May 28, 1963 13 Sheets-Sheet 8

Dec. 13, 1966 N. H. STOCHEL 3,292,156

DATA SIGNAL STORAGE CIRCUIT

Filed May 28, 1963 13 Sheets-Sheet 9

United States Patent Office 3,292,156
Patented Dec. 13, 1966

3,292,156
DATA SIGNAL STORAGE CIRCUIT

Nathan H. Stochel, New York, N.Y., assignor to Bell Telephone Laboratories, Incorporated, New York, N.Y., a corporation of New York Filed May 28, 1963, Ser. No. 283,855
11 Claims. (Cl. 340—172.5)

This invention relates to data transmission systems and, more particularly, to converters for interconnecting data transmission sets having different signaling rates.

A broad object of this invention is to accept signals having a first signaling rate and retransmit the signals at another signaling rate.

In the copending application of T. L. Doktor, G. Parker, L. A. Weber and H. M. Zydney, Serial No. 141,672, filed September 29, 1961, which issued as patent 3,113,176 on December 3, 1963, there is disclosed a subscriber data set which may be connected to a telephone line and which sets up calls to other similar data sets by way of the telephone switching network. The data set includes a conventional teletypewriter for transmitting and printing the data signals, a modulator for converting the data signals to voice frequency signals suitable for transmission over the telephone lines, and a modulator for converting received voice signals to data signals recognizable by the teletypewriter. In addition, the data set is arranged to release the telephone connection when a prolonged spacing disconnect signal is received. A timer is provided to distinguish between the disconnect signal and a shorter duration "break" signal which, as is well known in the art, interrupts the sending mechanism of the teletypewriter to permit the other station to break into the conversation.

The data sets, in accordance with the requirements of the subscribers, may employ various permutation element codes and transmit at different signaling rates. To interconnect two otherwise incompatible sets, code translation and speed conversion is required. In a preferred arrangement wherein a high speed set transmits to a low speed set, the received signals are applied to a translator and the translated signal elements are stored in a buffer store prior to retransmission at the lower signaling rate. Continuous transmission from the higher speed set, however, tends to fill the buffer store. In addition, the "break" signal, which is identified by its duration and not by a permutation of signal elements, cannot be stored by the buffer store.

Accordingly, it is an object of this invention to prevent store overflow.

It is a further object of this invention to control data sets interconnected by a buffer store when the buffer store is approaching its capacity.

It is another object of this invention to retransmit certain signals without intermediate storage.

In accordance with a feature of this invention, the converter sends a "restraint" signal back to the transmitting station to advise the station operator that the buffer store is beginning to fill and, in the event that the transmitting operator ignores the "restraint" signal and the store continues to fill, a signal generator sends a "break" signal to the transmitting station.

In accordance with another feature of this invention, the reception of signals from the transmitting set after the generation of the store "break" signal is recognized as a trouble condition and a disconnect signal is sent to both the sending and receiving sets.

In accordance with a further feature of this invention, the storage of signals is precluded, when the store "break" condition occurs, until the buffer store partially empties.

In accordance with another feature of this invention, when a "break" signal, sent by the receiving set to break into the conversation, is detected, the signal generator is operated to retransmit the "break" signal without intermediate storage.

In accordance with a further feature of this invention, the converter determines whether a store "break" or communication "break" signal is being transmitted and in the event that the signal is a communication "break," the signals in the buffer store are discarded to preclude continuing transmission to the set breaking into the conversation from the buffer store.

The foregoing and other objects and features of this invention will be fully understood from the following description of an illustrative embodiment thereof, taken in conjunction with the accompanying drawing, wherein:

FIGS. 1 through 10, when arranged as shown in FIG. 11, show the details of circuits and equipment which cooperates to form a translator-converter in accordance with this invention;

FIGS. 12A through 15A disclose the details of certain circuit elements suitable for use in the illustrative embodiment of the translator converter;

FIGS. 12B through 15B identify the symbols of the circuit element of FIGS. 12A through 15A, respectively, employed in FIGS. 1 through 10; and FIGS. 16 and 17, when arranged as shown in FIG. 18, show in block form the general functional elements of the illustrative embodiment of the translator-converter.

*General description*

Referring now to FIGS. 16 and 17, there is disclosed in block form the functional components of the translator-converter and the manner in which it is connected to a telephone office. The telephone office is generally shown in block 1601. Connected to telephone office 1601 are a plurality of subscriber lines 1600 which may terminate in data sets similar to the set disclosed in the T. L. Doktor et al. application. Extending from telephone office 1601 is line loop 1602 which line loop is connected to demodulator 1603 and modulator 1604. Demodulator 1603 includes a discriminator circuit and associated apparatus suitable for accepting frequency shift signals from a data set of the type disclosed in the above-identified application of T. L. Doktor et al.

As disclosed in the T. L. Doktor et al. application, the data set is arranged to transmit signals within a first frequency band hereinafter referred to as the $F_1$ band and receives signals in a second frequency band hereinafter referred to as the $F_2$ band when the call is originated therefrom. Accordingly, demodulator 1603 is adapted to receive frequency shift signals within the $F_1$ band from the originating set and provides at the output thereof corresponding direct-current data signals. Conversely, modulator 1604 includes a modulator oscillator arranged to accept data signals and convert them to frequency shift signals in the $F_2$ band. As disclosed in detail hereinafter, modulator 1604 is also arranged to respond to the impression of a signal on lead signal 1644 by superimposing a "restraint" signal on the frequency shift output signal. Accordingly, it is thus seen that modulator 1604 is adaptable to transmit signals to an originating data set.

Loop lead 1605 extends from telephone office 1601 to demodulator 1606 and modulator 1607. Demodulator 1606 is substantially identical to demodulator 1603 with the exception that it is arranged to accept signals in the $F_2$ band from a terminating station. Similarly, modulator 1607 is substantially identical to modulator 1604 with the exception that it can provide signals in the $F_1$ band to the terminating data set.

Assuming now that a data set capable of sending and receiving 100 words per minute desires to communicate with a data set capable of sending and receiving 60 words per minute, it is evident that a translator and buffer storage is required to effect storage and retransmission of the signals. When the 100-speed station dials the digits of the desired 60-speed station, the marker, not shown, of telephone office 1601 cuts through the office link circuits to loop lead 1602 and 1605. The telephone office then proceeds to ring the called station in the conventional manner and, as described hereinafter in detail, completes the connection of the answering station to demodulator 1606 and modulator 1607 when the call is answered. As described in detail in the above-identified application of T. L. Doktor et al., the two data sets provide a "hand-shaking" connect sequence which is concluded by the transmission of a marking tone by the originating set. This marking tone is detected by demodulator 1603 and passed on to connect control circuit 1609. Connect control circuit 1609, in turn, extends the output of demodulator 1603 to lead 1612 whereby data signals received from the originating station are applied by way of lead 1612 to switch 1610. Since the call has been originated by a 100-speed station, switch 1610 is in a normal position, which position extends lead 1612 to lead 1611. Accordingly, signals received from the originating station are impressed upon lead 1611.

When data signals are received from the 100-speed station these signals are applied by way of lead 1611 to serial-to-parallel converter 1701, which converter preferably includes a plurality of sequential stages. In addition, lead 1611 extends to start-stop control circuit 1702, which circuit responds to the initial start element of each data character by applying control pulses to serial-to-parallel converter 1701. The control pulses, in turn, function to shift the elements of each data signal to appropriate stages in serial-to-parallel converter 1701 and pass the elements in parallel form to translator 1703 after all the elements of the characters have been received.

Translator 1703 recognizes the 100-speed data characters and together with matrix 1704 converts them to corresponding 60-speed data characters. These data characters are then applied to the 20th stage of buffer store 1705. Translator 1703 also provides, in response to the application of each data character, a marking pulse at the output thereof, which pulse is also applied to the 20th stage of buffer store 1705 to indicate the presence of a stored character therein.

Buffer store 1705 comprises a 20-stage shift register which accepts a character in the 20th stage and rapidly shifts the characters to the first stage thereof. The application of subsequent characters to buffer store 1705 then results in the shifting of the subsequent characters to empty storage stages immediately following the first stage. Accordingly, the characters queue up behind the initial character stored in the first stage.

The character in the first stage is read out by parallel-to-serial converter 1706 which converts the elements of the character to serial form and impresses them on lead 1707. As each character is read by parallel-to-serial converter 1706, it is removed from stage 1 of buffer store 1705, permitting the character stored in stage 2 to advance to the first stage and the stored characters subsequent thereto to similarly advance one stage. This maintains the characters queued up to stage 1 in buffer store 1705.

Lead 1707 extends to switch 1617 and since the call is originated by 100-speed station, switch 1617 is in the normal condition wherein lead 1707 is extended to lead 1618. Lead 1618, in turn, extends to the input of gate 1619 and the output of gate 1619 is connected to modulator 1607. Accordingly, the serial data signals derived from parallel-to-serial converter 1706 are applied to modulator 1607 thereby retransmitting the signals in the $F_1$ band to the 60-speed station.

Signals received from the 60-speed station are detected by demodulator 1606, as previously described, and demodulator 1606, in turn, impresses these signals through switch 1621 to lead 1622. Lead 1622 extends to the input of serial-to-parallel converter 1623, which converter functions in substantially the same manner as serial-to-parallel converter 1701. The output of serial-to-parallel converter 1623 is connected to translator-matrix 1624 and translator-matrix 1624, in turn, is connected to parallel-to-serial converter 1625. Accordingly, data signals received from the terminating 60-speed station are converted to parallel form by serial-to-parallel converter 1623, translated to corresponding 100-speed data characters by translator-matrix 1624 and reconverted to serial form by parallel-to-serial converter 1625. These serial signals are then passed by way of lead 1626, switch 1617, and lead 1627 to gate 1628. Gate 1628, in turn, is connected to the input of modulator 1604 whereby the signals are retransmitted in the $F_2$ frequency band to the 100-speed originating station. It is noted that intermediate storage is not required for 60-speed to 100-speed conversion since the signals can be read out as rapidly as they are received.

When a communication "break" signal is received from either station, the signal is directly retransmitted to the other station without intermediate storage. In addition, any message signals stored in the translator-converter are discarded to terminate the transmission of signals to the station sending the "break."

Assuming now that a prolonged spacing "break" signal is received from the 100-speed station, this "break" signal is applied to lead 1612, as previously described, and then passed through switch 1614 to 100 to 60-speed break converter 1615. Break converter 1615 times the duration of the signal and, at the termination thereof, regenerates a signal having a duration corresponding to a 60-speed "break" signal. The 60-speed "break" signal is then passed by way of switch 1630 and lead 1631 to gate 1619. Accordingly, the break signal is impressed on modulator 1607 and thus transmitted to the 60-speed terminating station.

The "break" signal regenerated by converter 1615 is also passed through gate 1632 to lead 1633 and lead 1633, in turn, extends to an input of gate 1726. In the normal condition, lead 1716, which extends to the other input of gate 1726, provides an enabling potential to the gate 1726 whereby an off-normal condition is produced at the output thereof in response to the "break" signal. This off-normal condition is passed to start-stop control circuit 1702 precluding the reception of signals by serial-to-parallel converter 1701 until the off-normal condition terminates. In addition, the output of gate 1726 extends by way of lead 1727 to the first stage of buffer store 1705 and to parallel-to-serial converter 1706. With the off-normal condition on lead 1727 the stored character in the first stage of buffer store 1705 is removed and each subsequent character is similarly removed as it advances to the first stage. In addition, the application of the off-normal condition to parallel-to-serial converter 1706 precludes the reading of the characters in the first stage of buffer store 1705, preventing the retransmission of the stored characters to the terminating station. Accordingly, all the stored characters are discarded.

If a "break" signal is received from the terminating station, this signal is detected by demodulator 1606 and passed by way of switch 1614 to 60 to 100-speed break converter 1616. Converter 1616, in response thereto, provides a 100-speed "break" signal at the output thereof, which signal is passed by switch 1630 and lead 1634 to gate 1628. Accordingly, the "break" signal is retransmitted by modulator 1604 to the originating station. In addition, the output of converter 1616 extends to gate 1632. Accordingly, during the retransmission of the "break" signal, an off-normal condition is provided to the translator in the same manner as previously described.

Continued transmission from the 100-speed station to the 60-speed station gradually fills up the buffer store due to the higher signal rate of the transmitting station. To preclude the overflowing of the storage, the translator is arranged to return a warning or "restraint" signal when the buffer store begins to fill up and a store "break" signal if transmission continues and the store fills.

The "restraint" signal comprises a frequency shift tone signal superimposed on the idle marking tone normally transmitted to the sending set. The sending set is preferably provided with a detecting arrangement for advising the operator that a "restraint" signal has been received. A suitable detecting arrangement is disclosed in the application of T. L. Doktor, Serial No. 283,854, concurrently filed herewith.

Assuming now that due to continuous transmission from the 100-speed station, received characters queuing up in buffer store 1705 fill the store through stage 12. This provides an enabling signal by way of lead 1709 to enable restraint signal generator 1710. Restraint signal generator 1710 provides a tone at the output thereof, which tone is applied by way of lead 1711 and switch 1636 to lead 1644. Accordingly, the tone is superimposed on the idle marking tone normally transmitted by modulator 1604.

If the 100-speed station interrupts its transmission, the characters will be continued to be read out of buffer store 1705. When a sufficient number of characters have been read out to empty stage 3, a resetting signal is applied by way of lead 1712 to restraint signal generator 1710. This removes the "restraint" tone at the output of generator 1710, removing the tone superimposed on the marking signal sent to the originating station. The sending operator is thus advised that transmission can again proceed.

In the event that the sending operator ignores the "restraint" signal or does not receive the "restraint" signal due to a line or equipment difficulty, continued transmission fills up more of the buffer store stages. Accordingly, when stage 19 becomes filled, an enabling signal is provided by way of lead 1714 to store break circuit 1715. The consequent enabling of store break circuit 1715 provides an enabling signal by way of lead 1716 to 60 to 100-speed break converter 1616. Converter 1616, in turn, generates a "break" signal which, as previously described, is transmitted back to the sending set halting transmission therefrom, as is well known in the art.

The enabling signal on lead 1716 is also provided to one input of gate 1718. The other input to gate 1718 is connected to the 15th stage of buffer store 1705 by way of lead 1717. Since the 15th stage is presently full, both input leads are enabled and gate 1718 enables, in turn, mark-hold circuit 1719. Mark-hold circuit 1719, in turn, holds the input to serial-to-parallel converter 1701 in the marking condition. This precludes the acceptance of signals by the translator, permitting the buffer store opportunity to reduce the number of characters stored therein. It is noted that lead 1716 also extends to gate 1726. The enabling signal on lead 1716 provides a disabling potential to gate 1726 and the gate is accordingly blocked, thus precluding the generation of the previously-described off-normal condition in response to the generation of the "break" signal by break converter 1616.

As a result of the store "break" condition, buffer store 1705 proceeds to empty stages 15 through 19. When stage 15 becomes empty, gate 1718 is disabled and the mark-hold condition is removed from the input of serial-to-parallel converter 1701, thus enabling the translator to again receive signals. As buffer store 1705 continues to empty, clearing out the storage of the 13th stage, store break circuit 1715 is reset by way of lead 1721. This removes the enabling signal applied by way of lead 1716 to gates 1718 and 1726. The subsequent emptying of buffer store 1705 then resets restraint signal generator 1710, as previously described, whereby the sending operation of T. L. Doktor et al.

In the event that due to line or equipment failure, the store "break" signal fails to stop transmission from the 100-speed station, it is desirable that the stations be disconnected since message characters will thereafter be lost. As previously described, when stage 15 of buffer store 1705 empties, the mark-hold condition is removed, enabling the reception of signals. Assuming that a character is received immediately thereafter, a marking pulse is transmitted by translator 1703, as previously described, and this marking pulse is applied to buffer store 1705. The application of the marking pulse to store break circuit 1715 during the previously-described enabled condition of circuit 1715 results in the impression of a spacing disconnect signal to lead 1720. This spacing disconnect signal is applied simultaneously to gates 1619 and 1628, thus transmitting the disconnect signal to the sending and receiving stations. At the data sets, the reception of the signal forces a disconnect to terminate the connection between the stations.

When the 100-speed station desires to terminate transmission, it sends an end-of-transmission character and thereafter disconnects by returning an on-hook signal to the telephone office. The end-of-transmission character is recognized by matrix 1704 which prepares end-of-transmission circuit 1723 by way of lead 1722. Since buffer store 1705 may have characters stored therein, these characters are continued to be read out by parallel-to-serial converter 1706 and retransmitted on to the 60-speed station, as previously described. When all the characters are read out, however, parallel-to-serial converter 1706 senses that stage 1 of buffer store 1705 is empty and passes a spacing disconnect signal to end-of-transmission circuit 1723. Within the transmission circuit 1723 now prepared, the spacing disconnect signal is passed by way of lead 1724, switch 1630 and lead 1631 to gate 1619. Accordingly, the disconnect signal is transmitted to the 60-speed station forcing the 60-speed station to disconnect. With both stations now disconnected, telephone office 1601 removes the connecting link circuit and the translator restores to the initial idle condition.

In the event that the 60-speed station desires to terminate transmission, a prolonged disconnect signal is transmitted. This disconnect signal is detected by demodulator 1606 and passed by way of switch 1614 and lead 1629 to 60-speed clear detector 1640. The consequent operation of detector 1640 results in the application of the 100-speed end-of-transmission character to parallel-to-serial converter 1625. Accordingly, the end-of-transmission character is passed by way of lead 1626, switch 1617 and lead 1627 to gate 1628. This character is thus transmitted to the 100-speed station forcing the station to disconnect and restoring the translator to the normal idle condition.

If a 60-speed station desires to call a 100-speed station, the marker in the telephone office connects the link circuits to loop lead circuits 1604 and 1605 in the manner previously described. In addition, however, an energizing potential is applied by telephone office 1601 to 60-speed appearance circuit 1608. Circuit 1608, in turn, operates switches 1610, 1614, 1621, 1617, 1630 and 1636. Message transmission from the 60-speed station is now detected by demodulator 1603 and applied to lead 1612 in the same manner as previously described. With switch 1610 operated, however, lead 1612 is connected to lead 1642 which, in turn, is connected to lead 1622. Accordingly, the message signals from the 60-speed station are converted to 100-speed characters and then passed by way of lead 1626 to switch 1617. Switch 1617 operated now connects lead 1626 to lead 1618, whereby the signals are retransmitted to the 100-speed terminating station. Conversely, signals received from the 100-speed station are detected by demodulator 1606 and passed to switch 1621. The previously-described operation of switch 1621 extends the output of demodulator 1606 to lead 1643 which lead, in turn, is connected to lead 1611. Accordingly, the 100-speed characters are converted to 60-speed characters and impressed on lead 1707, as previously described. These signals are applied to switch 1617 which now extends lead 1707 to lead 1627. Thus the characters are now passed through modulator 1604 to the 60-speed originating station.

In the event that a communication "break" is received from the 60-speed station, switch 1614 now extends the "break" signal on lead 1612 to break converter 1616.

This provides the off-normal condition, as previously described, and, in addition thereto, retransmits the "break" through operated switch 1630 to lead 1631. The "break" is thus retransmitted to the 100-speed terminating station. Conversely, a "break" signal from the 100-speed station is detected by demodulator 1606 and passed by switch 1614 to break converter 1615. The regenerated "break" signal is then applied through operated switch 1630 and lead 1634 to gate 1628. Accordingly, the "break" signal is retransmitted to the 60-speed originating station.

Recalling now that a "restraint" signal is generated when the 12th stage of the buffer store is filled, it is noted that this "restraint" signal is now applied by way of lead 1711 and operated switch 1636 to lead 1637. Accordingly, the "restraint" tone is passed to modulator 1607 sending the tone back to the 100-speed terminating station. The translator circuit otherwise operates in the same manner as previously described, with the exception that the disconnect signal from the 60-speed station is passed by way of lead 1612 and switch 1614 to lead 1629. This permits the coding of parallel-to-serial converter with the end-of-transmission character in the same manner as previously described. Since output lead 1626 of parallel-to-serial converter 1625 now extends by way of lead 1618 to gate 1619, the character is thus transmitted to the 100-speed transmitting station. Upon the disconnect of the stations, loop lead 1602 and 1605 are disconnected from the link circuit in the same manner as previously described, and 60-speed appearance circuit 1608 is restored, restoring, in turn, switches 1610, 1614, 1621, 1630, 1617 and 1636 to the normal condition. This returns the translator to the initial idle condition.

*Detailed description*

Figure 12A:
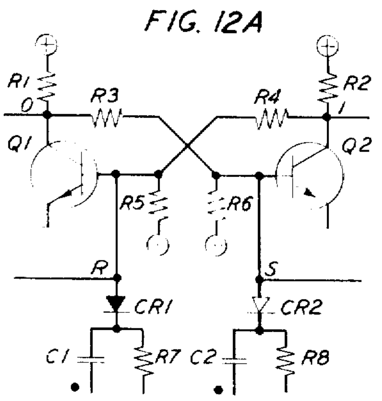

In the detailed description of applicant's preferred embodiment of the invention, certain circuits are repeatedly used to provide appropriate logic. Referring now to FIG. 12A, a flip-flop circuit is shown having input terminals R and S and output terminals 0 and 1. The application of a negative impulse to input terminal R, for example, is applied to the base of transistor Q1, turning OFF the transistor if it is ON. This supplies positive battery through resistors R1 and R3 to the base of transistor Q2 whereby the latter transistor turns ON. With transistor Q2 turned ON, positive battery normally applied to the collector thereof by way of resistor R2 is removed and negative battery applied by way of resistor R5 to the base of transistor Q1 therefore maintains the latter transistor nonconductive. This condition is hereinafter referred to as the reset condition whereby, with transistor Q1 nonconductive, terminal 0 is in the positive or high signal condition, and with transistor Q2 conductive, terminal 1 is in the ground or low signal condition.

Assuming now that a negative impulse is applied to terminal S, transistor Q2 is turned OFF and the positive battery applied through resistor R2 is passed through resistor R4 to the base of transistor Q1, turning the latter transistor ON. This removes the positive battery at the collector of transistor Q1 and transistor Q2 is maintained OFF by negative battery applied by way of resistor R6. This condition is hereinafter referred to as the set condition wherein output terminal 1 is in the high signal condition and output terminal 0 is in the low signal condition.

Assuming that the flip-flop is in the set condition, the circuit may also be reset by the application of a negative pulse to terminal 1. This negative pulse on terminal 1 passes through resistor R4 to turn transistor Q1 OFF. When transistor Q1 turns OFF, transistor Q2 turns ON, as previously described, whereby the flip-flop is placed in the reset condition. Conversely, when the flip-flop is in the reset condition, the application of a negative signal to terminal 0 turns transistor Q2 OFF and turning ON, in turn, transistor Q1 thereby placing the flip-flop in the set condition.

The flip-flop may also be placed in the reset condition by the application of a negative impulse to the reset terminal by way of diode CR1. This negative impulse may be provided through capacitor C1 and diode CR1 in the event that diode CR1 is forward-biased by a low condition signal applied through resistor R7. The combination of diode CR1 is forward-biased by a low condition signal applied through resistor R7. The combination of diode CR1, capacitor C1, and resistor R7 is hereinafter referred to as a gate. A similar gate comprising diode CR2, capacitor C2 and resistor R8 is shown connected to the S terminal. Accordingly, with a low condition signal applied through resistor R8, a negative impulse may be passed through capacitor C2 and diode CR2 to set the flip-flop. It is noted at this time that the enabling of the gate occurs a short interval after the application of the low condition signal due to the inherent delay provided by the capacitor together with the resistor.

Figure 12B:
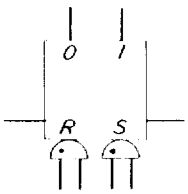

The flip-flop is shown symbolically in FIG. 12B and provided with the previously described input and output leads. In addition, the input reset gate and the input set gate are shown wherein the input lead extending to the dot within the gate symbol comprises the corresponding input lead extending to the capacitor C1 or capacitor C2.

Figure 13A:
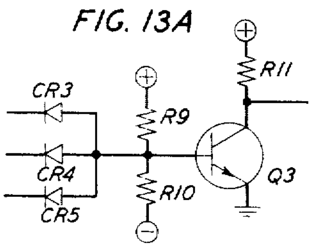

An inverting AND gate is shown in FIG. 13A which gate includes transistor Q3. The base of transistor Q3 is connected to positive battery by way of resistor R9 and to negative battery by way of resistor R10, the subsequent voltage applied to the base being slightly above ground whereby transistor Q3 is normally conducting. Other inputs to the base of transistor Q3 are provided through diodes CR3, CR4 and CR5. It is thus seen that in the event one or more of the inputs are in the low signal condition, this low condition is passed through the associated diode to cut off transistor Q3. Accordingly, transistor Q3 can conduct only in the event that all of the inputs are in the high condition. When transistor Q3 is conducting, ground is applied through its emitter-to-collector path to the output thereof. Conversely, when the transistor is nonconducting, positive battery is applied tp the output thereof by way of resistor R11. Accordingly, the output of the gate is in the high signal condition unless all of the inputs are in the high signal condition, whereupon a low signal condition is produced at the output.

Figure 13B:
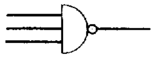

The inverter gate is symbolically shown in FIG. 13B which discloses three inputs and a single output to correspond with the circuit shown in FIG. 13A.

Figure 14A:
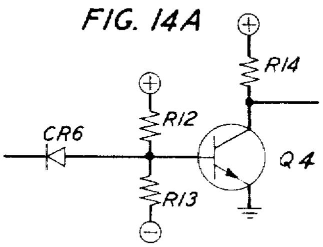

An inverter circuit is shown in FIG. 14A, which circuit includes transistor Q4. Assuming a low condition signal is applied to this circuit, this signal is applied through diode CR6 to the base of transistor Q4, turning the transistor OFF, whereby a high signal condition is provided at the output thereof by way of resistor R14. The application of a high signal condition to the input of the inverter is blocked by diode CR6. In this event, the voltage divider comprising resistors R12 and R13 is arranged to apply a positive voltage with respect to ground to the base of transistor Q4. This turns ON transistor Q4 providing collector ground corresponding to a low signal condition to the output of the inverter.

Figure 14B:
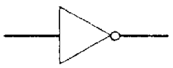

The inverter is shown symbolically in FIG. 14B wherein the left-hand lead, as seen in FIG. 14B, corresponds to the input and the right-hand lead corresponds to the output of the inverter.

Figure 15A:
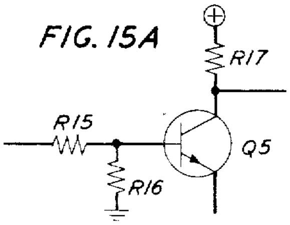

A buffer amplifier is shown in FIG. 15A. The buffer amplifier includes transistor Q5 having its base connected by way of resistor R15 to one input lead and having its emitter connected to another input lead. The collector of transistor Q5 is connected to an output lead. In the normal condition transistor Q5 is nonconductive, and its collector output is in the high signal condition. Transistor Q5 is rendered conductive when ground is applied to the emitter thereof and a high signal condition is applied to the base thereof by way of resistor R15.

Figure 15B:
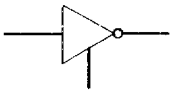
Figures 16, 18:
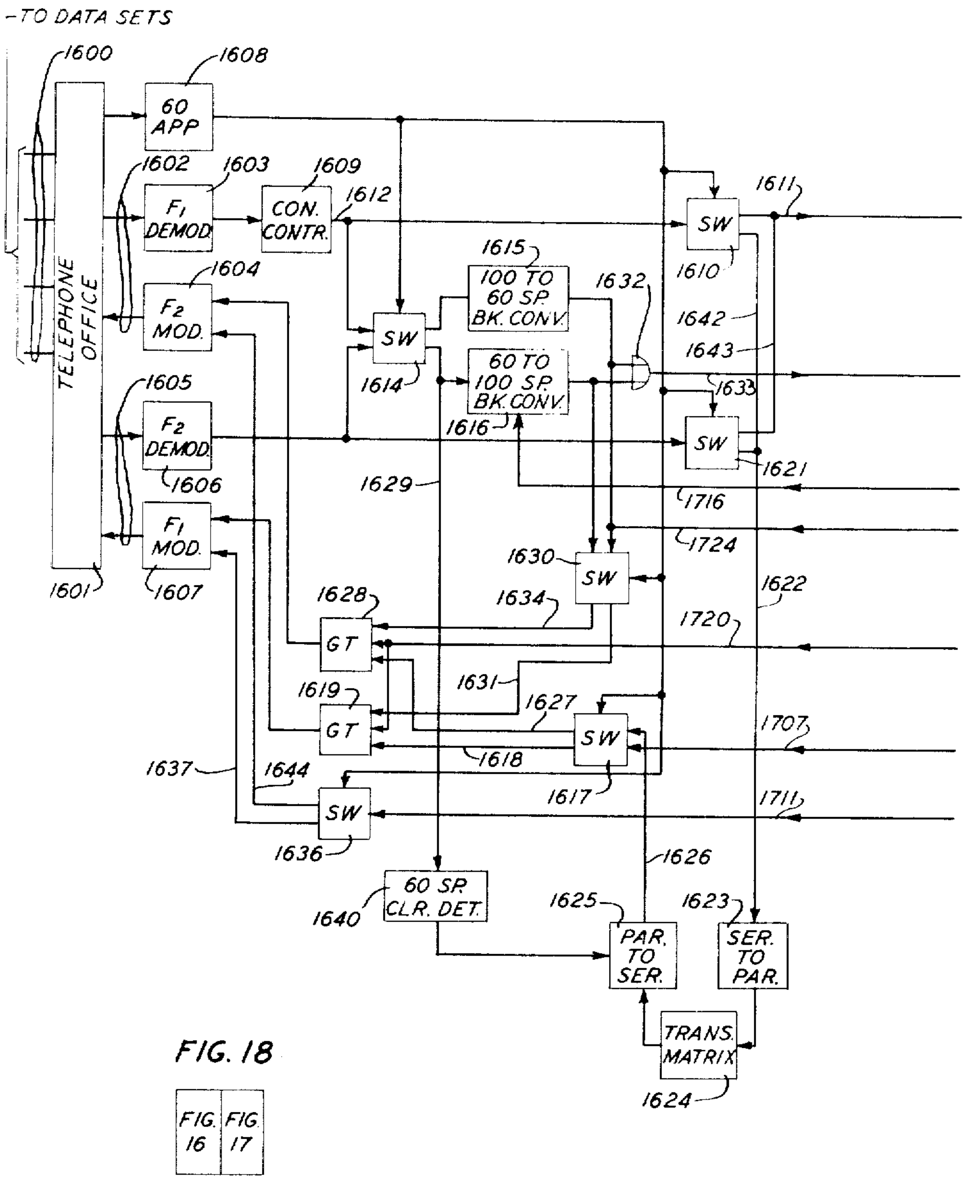
Figure 17:
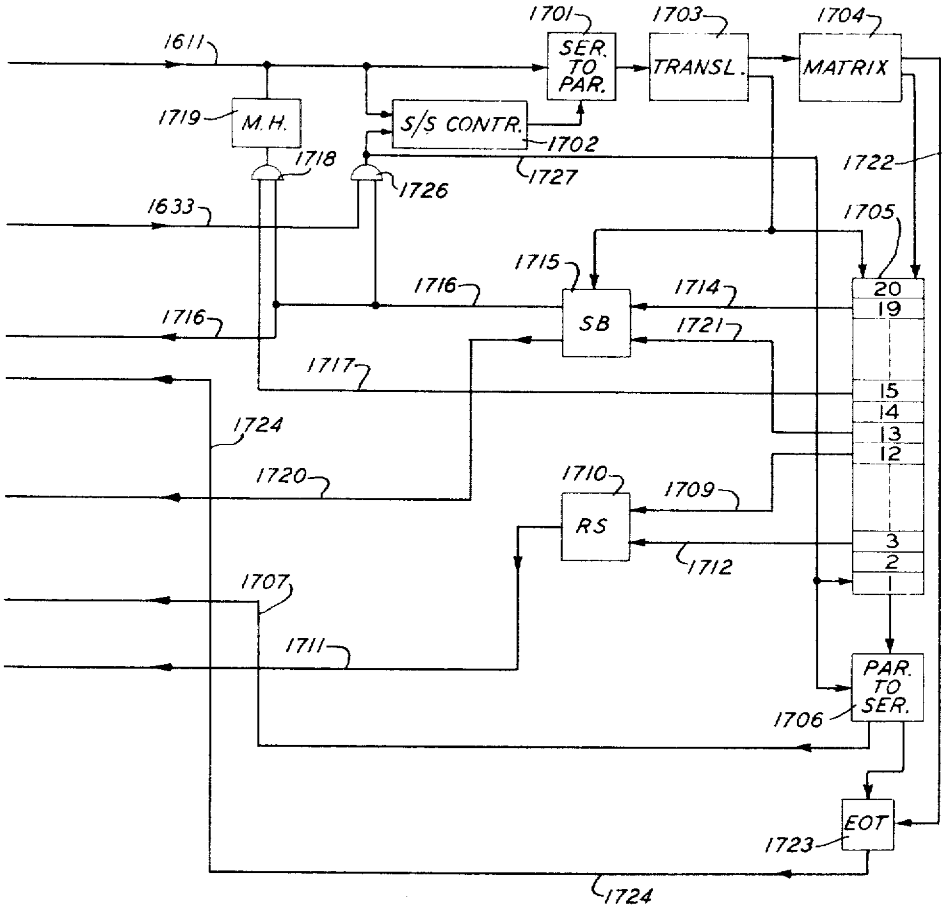

The buffer amplifier is shown symbolically in FIG. 15B wherein the left-hand lead, as seen in FIG. 15, corresponds to the input lead to the base of transistor Q5; the right-hand lead corresponds to the collector output lead, and the lower middle lead corresponds to the input to the emitter.

In the several figures of the drawing, relay contacts are shown detached from the relay windings. Contacts which are closed when the associated relay is de-energized, known as break contacts, are represented by a single short line perpendicular to the conductor line, while contacts which are closed when the relay is energized, known as make contacts, are represented by two short cross lines diagonally intersecting the conductor line.

*Connecting the data sets to the converter*

Figures 1, 11:
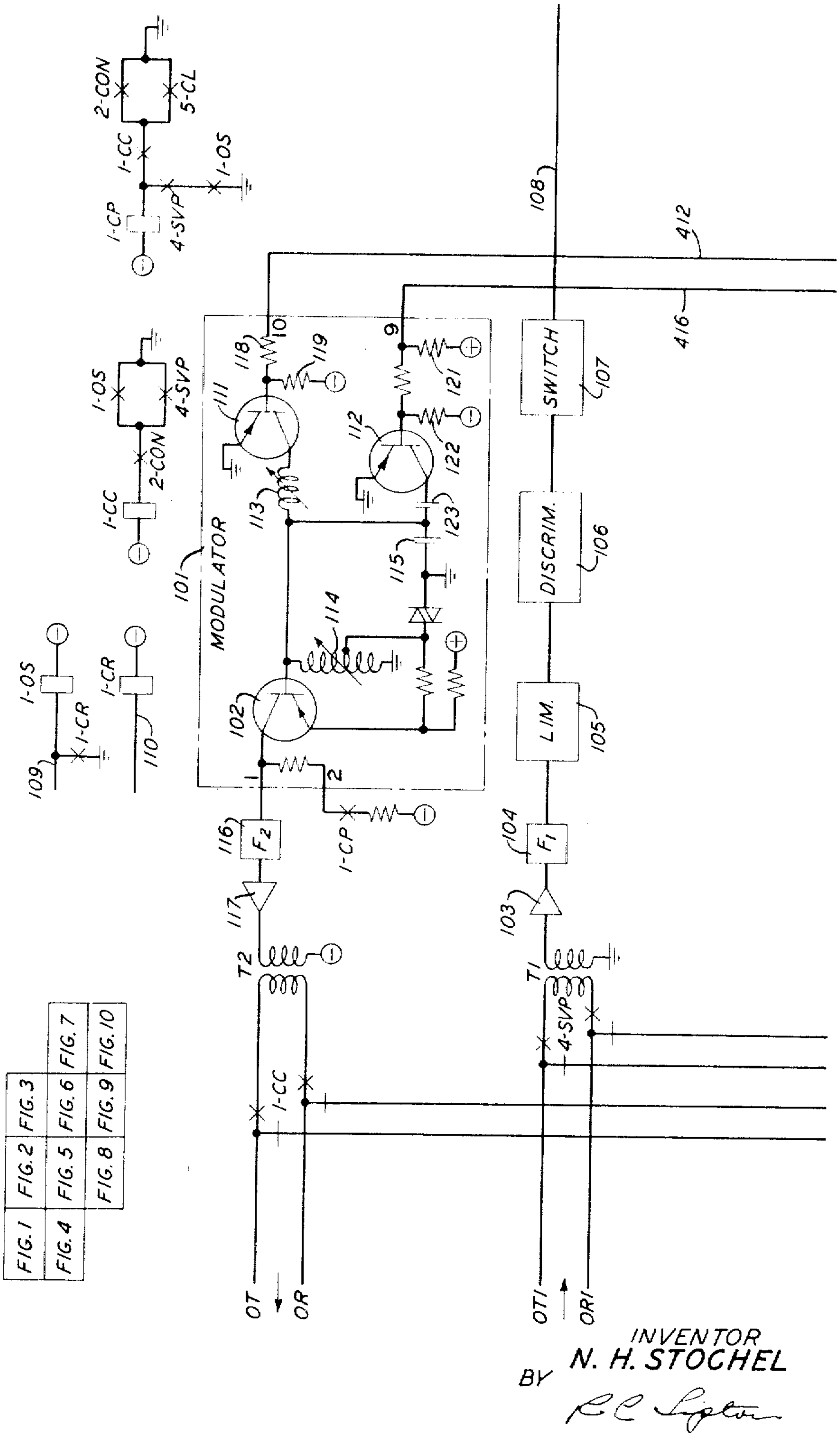

Referring now to FIGS. 1 through 10, a first telephone loop indicated by leads OT and OR, FIG. 1, and a second telephone loop indicated by leads OT1 and OR1, FIG. 1, are connectable to the originating subscriber station. Similarly, a telephone loop comprising leads IT1 and IR1 and the telephone loop comprising leads IT and IR are extendable to the answering or terminating station. As shown, signals are received over the loop comprising leads OT1 and OR1 and over the loop comprising leads IT and IR, while signals are transmitted over the telephone loop comprising leads OT and OR and over the loop comprising leads IT1 and IR1.

When a 100-speed station wishes to communicate with a 60-speed station and dial code digits of the 60-speed station are dialed and the central telephone office routes the call to a 100-speed originate appearance of an outgoing trunk in the telephone office, not shown. The telephone office marker is thus informed that a 100-speed to 60-speed conversion is required and the marker proceeds to cut through the link circuits by connecting loop leads OT, OR, OT1 and OR1 to the originating station and connecting leads IT1, IR1, IT and IR to the outgoing sender. In addition, before releasing, the marker applies ground to lead 109, operating relay 1–OS.

In the event that a 60-speed station wishes to communicate with a 100-speed station and the digits of the 100-speed station having been dialed, the call is routed to the 60-speed originate appearance of the outgoing trunk. The operation of the marker cutting through the link circuits is then the same as previously described for the 100-speed station with the exception that prior to release the marker applies ground to lead 110 operating relay 1–CR which, in turn, applies operating ground by way of its make contacts to relay 1–OS. Other functions of relay 1–CR operated will be described hereinafter.

Assuming now that a 100-speed station is calling a 60-speed station and relay 1–OS is operated and relay 1–CR is released, as previously described, the connection of the sender to the outgoing link provides the function of calling the terminating station in accordance with the digits dialed by the originating station. When the called station goes off hook, simplex ground is provided across leads IT and IR whereby relay 4–SVP is operated. The operation of relay 4–SVP connects leads OT1 and OR1 across the primary winding T1 and connects leads IT1 and IR1 across the primary of winding T4. In addition, relay 4–SVP operated completes an operating path for relay 1–CP by way of the make contacts of relays 4–SVP and 1–OS.

As described in the above-mentioned application of T. L. Doktor et al., the terminating station upon going off hook in response to the call and after an appropriate guard interval, returns a marking tone in the $F_2$ frequency band. This marking tone is received across leads IT and IR and then applied through the break contacts of relay 1–CC to leads OT and OR and then back to the originating station. The originating station, in turn, after approximately a one-half second interval, sends a marking signal in the $F_1$ frequency band, which signal is received across leads OT1 and OR1 by way of the make contacts of relay 4–SVP to the primary of transformer T1. The tone is thus induced across the secondary of transformer T1 and passed by amplifier 103 and filter 104 to limiter 105. A limited tone signal is then applied to discriminator 106 and the resultant direct current signal is developed by switch 107 and passed on to lead 108.

It is to be noted that the operation and function of amplifier 103, filter 104, limiter 105, discriminator 106 and switch 107 is substantially identical to the operation of the receiving portion of the data set disclosed in the above-identified application of T. L. Doktor et al. when the set is operating in the terminating mode. Accordingly, there is applied to lead 108 a low signal which is preferably close to ground when a marking tone is received and a high signal which preferably has a potential positive to ground when a spacing tone is received.

Since a marking tone is now being received from the originating station, lead 108 is in the low potential condition. This low signal is applied through break contacts of relay 2–CON, FIG. 2, and inverter 201 whereby a high signal is applied to timer 202. Timer 202 is arranged to provide a low signal output if a high signal is applied thereto for a predetermined interval of time. This low signal applied to amplifier 203 provides operating ground through break contacts of relay 2–CON to the winding of relay 2–CON and relay 2–CON locks through its own make contacts, lead 206 and the make contacts of relay 1–CP to ground.

Relay 2–CON operated extends battery to the collector of the modulator transistor in modulator 401, which transistor corresponds to transistor 102 in modulator 101. Considering modulator 101, the collector of transistor 102 is extended to $F_2$ filter 116 and to the make contacts of relay 1–CP. Accordingly, when relay 1–CP operates, as previously described, negative battery is extended to the collector of transistor 102. Modulator 101 also includes transistor 111, which is normally conductive and transistor 112 which is normally nonconductive. With transistor 111 conductive, inductor 113 is connected to ground by way of the collector-to-emitter path of transistor 111. This places inductor 113 in shunt to the tank circuit connected to the base of transistor 102, which tank circuit includes inductor 114 and capacitor 115. Under this condition, transistor 102 is arranged to oscillate at a frequency corresponding to the marking tone in the $F_2$ frequency band. When transistor 111 is rendered nonconductive, as described hereinafter, inductor 113 is removed and transistor 102 oscillates at a lower frequency corresponding to the spacing tone in the $F_2$ frequency band. The function of transistor 112 is described hereinafter.

Modulator 401 is arranged in substantially the same manner as modulator 101 with the exception that the tank circuit is arranged to oscillate in the $F_1$ frequency band. Since relay 2–CON is operated, a marking tone is thus applied through filter 402 and amplifier 403 to transformer T4. Transformer T4, in turn, passes the marking tone through the make contacts of relay 4–SVP thereby impressing the signal across leads IT1 and IR1. Accordingly, the marking tone in the $F_1$ frequency band is transmitted to the called station advising the station that the originating station is ready to transmit.

Returning now to relay 2–CON operated, the signals applied to lead 108 are now transferred to inverter 204 by the make contacts of relay 2–CON. The inverted signals at the output of inverter 204 are then applied to inverter 201 via the make contacts of relay 2–CON. Accordingly, the high signals applied to timer 202 now correspond to received spacing signals and low signals correspond to received marking signals whereby timer 202 now looks for prolonged spacing signals.

Figure 5:
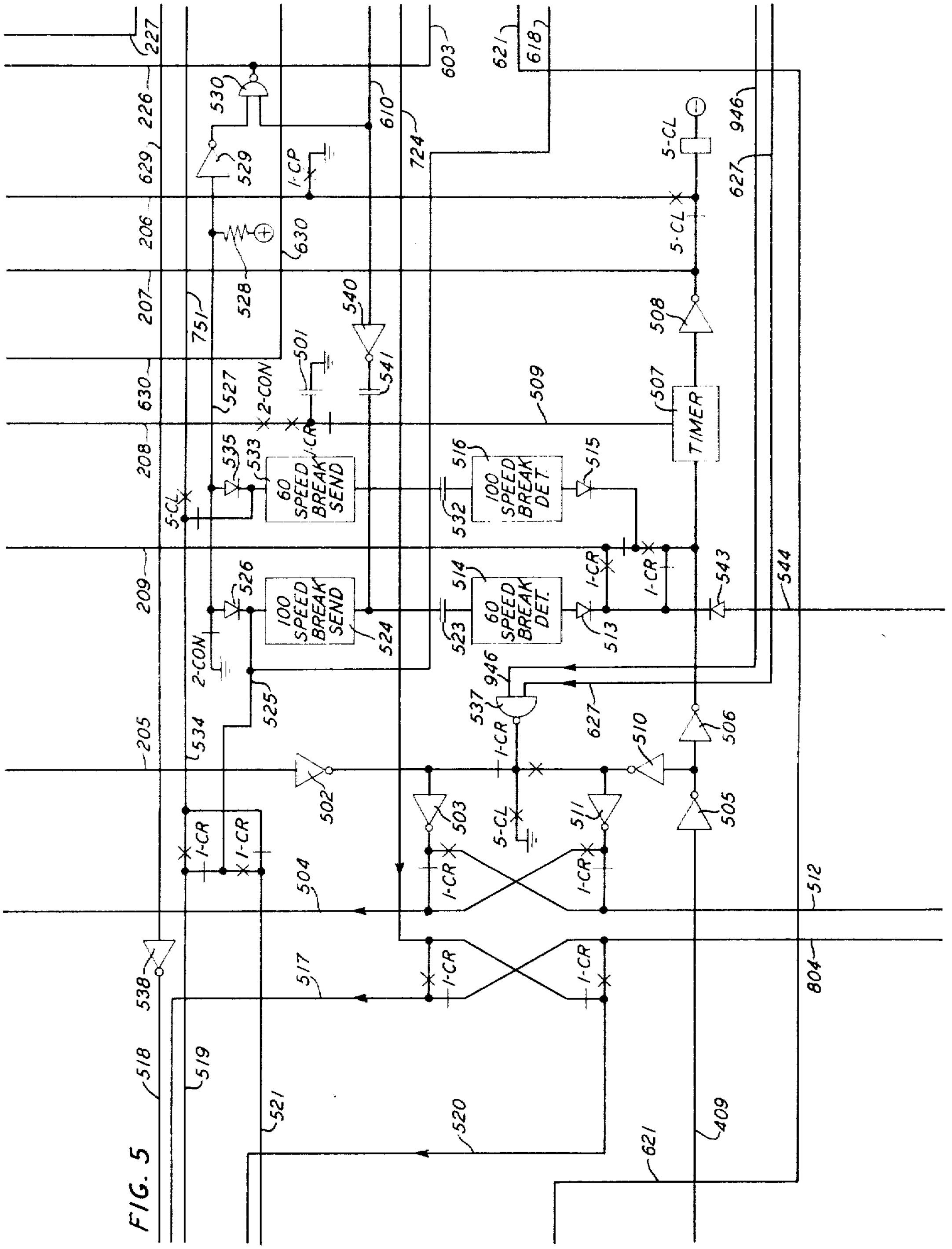

The output of inverter 204 is also applied through lead 205 to inverter 502, FIG. 5. The inverter 502 output, in turn, extends to the input of inverter 503. With relay 1–CR released, the inverter 403 applies to lead 504 high signals corresponding to received marking signals and low signals corresponding to received spacing signals due to the three inversions of the signals as applied to lead 108. As described hereinafter, these signals on lead 504 extend to the input of the 100-speed to 60-speed translator shown in FIG. 2.

With relay 2–CON operated, the output of amplifier 203 is disconnected from the winding of relay 2–CON by the break contacts of relay 2–CON. In addition, the output of amplifier 203 is extended through the make contacts of relay 2–CON to lead 207 and lead 207, in turn, extends through the break contacts of relay 5–CL, FIG. 5, to the winding of relay 5–CL. This prepares relay 5–CL for operation in the event that the originating station transmits a prolonged spacing signal.

At this time it is also noted that the output of inverter 201 is connected to lead 209. With relay 1–CR released, lead 209 extends through the break contacts of relay 1–CR, FIG. 5, to diode 515 and diode 515, in turn, is connected to the input of break detector 516. With the output of inverter 201 in the low signal condition due to the reception of a marking signal, this low signal condition is applied through diode 515 to break detector 516, maintaining the break detector disabled. Break detector 516 constitutes a timer which, upon the removal of the low condition signal, proceeds to time the interval corresponding to a "break" signal from a 100-speed station, which "break" interval is substantially greater than any character interval but of less duration than the timing interval of timers 202 or 507. The function of break detector 516 will be further discussed hereinafter.

Relay 2–CON operated also completes an operating path for relay 1–CC by way of make contacts of relay 2–CON, and make contacts of relay 1–OS or make contacts of relay 4–SVP in shunt thereto. In addition, relay 2–CON operated completes a supplementary operating path for relay 1–CP by way of make contacts of relay 1–CC and make contacts of relay 2–CON.

The operation of relay 1–CC extends the loop consisting of leads OT and OR across the primary of transformer T2, extends the loop comprising leads IT and IR across the primary of transformer T3, and disconnects the paths connecting these loops through the break contacts of relay 1–CC. Outgoing signals from modulator 101 can now be provided through filter 116 and amplifier 117 to transformer T2 and thence across loop leads OT and OR. In addition, relay 1–CC operated removes a disabling ground from the input of discriminator 407, FIG. 4. Thus, incoming signals from the terminating station received over loop leads IT and IR and applied across transformer T3 are impressed on amplifier 404 which, in turn, applies the signals through filter 405 to limiter 406. The limiter signals are then applied to discriminator 407 which, together with switch 408, converts the received marking tone to a low signal and the received spacing tone to a high signal and impresses these signals on lead 409.

The mark and space signals on lead 409 are applied to the input of inverter 505 and the output of inverter 505, in turn, extends to the input of inverter 506. Accordingly, inverter 506 impresses on the input of timer 507 a low signal condition in response to a marking tone and a high signal condition in response to a spacing tone.

Timer 507 is substantially identical to timer 502 with the exception that an additional capacitor 501 is connected thereto through the break contacts of relay 1–CR and lead 509 whereby the timing interval is extended to correspond to the duration of a spacing disconnect signal from the 60-speed station. Similar to timer 202, timer 507 times the high signal spacing condition applied to the input thereof. The time-out of timer 507 in response to the disconnect signal is applied to amplifier 508 resulting in operating ground to the winding of relay 5–CL through the break contacts of relay 5–CL. The operation of relay 5–CL is discussed hereinafter.

The output of inverter 506 also extends through the break contacts of relay 1–CR to diode 513 and diode 513, in turn, is connected to the input of break detector 514. Break detector 514 is a timer which is arranged in substantially the same manner as break detector 516 with the exception that its timing interval is of a greater duration to correspond with a "break" signal from a 60-speed station. With a low signal corresponding to a received marking signal at the output of inverter 506 and thus applied through diode 513 to the input of break detector 514, timing of the break detector is precluded. In the event, however, that a spacing signal is received and the output of inverter 506 goes to the high signal condition, the removal of the low signal condition from the input of break detector 514 initiates the timing operation. Accordingly, break detector 514 times out in the event that a "break" signal is received from the 60-speed station.

Returning now to inverter 505, the output thereof is also connected to inverter 510 which, in turn, is connected to inverter 511. Accordingly, with inversions provided by inverters 505, 510 and 511, a high signal condition corresponding to a received marking signal is applied to lead 512 and a low signal condition corresponding to a received spacing signal is applied to lead 512. Lead 512, in turn, extends to the input of the 60-speed to 100-speed translator converter generally shown in FIG. 8 which arrangement is described hereinafter.

If the call is originated by a 60-speed station, relay 1–CR is operated, as previously described, together with relay 1–OS. During the connect sequence, relays 4–SVP and 1–CP also operate in the same manner as previously described for a 100-station call. The marking tone from the 60-speed station is thus received by discriminator 106 and a resultant high signal is applied to timer 202 by way of lead 108 and inverter 201. Accordingly, the 60-speed marking tone connect signal operates timer 202 to operate, in turn, relay 2–CON. This results in the operation of relay 1–CC as previously described. With relay 1–CR operated, the additional capacitor 501 is now connected to timer 202 through the make contacts of relays 1–CR and 2–CON and lead 208 whereby the timing interval is extended to correspond to the duration of the 60-speed spacing disconnect signal previously timed by timer 507.

Since relay 1–CR is operated when a call is originated from a 60-speed station, signals from the 60-speed station are now passed via lead 108, the make contacts of relay 2–CON, inverter 204, lead 205, inverter 502, inverter 503, the make contacts of relay 1–CR and lead 512 to the 60-speed to 100-speed translator. In addition, the received signals on lead 108 are applied by way of the make contacts of relay 2–CON, inverter 204, the make contacts of relay 2–CON, inverter 201, lead 209, the make contacts of relay 1–CR and diode 513 to 60-speed break detector 514. Thus the signals from the 60-speed station are passed to lead 512 and to detector 514 when the station is originating or terminating a call.

The signals from the 100-speed station are now passed to lead 409 and then via inverter 505, inverter 510, inverter 511, the make contacts of relay 1–CR and lead 504 to the input of the 100-speed to 60-speed translator. In addition, the signals on lead 409 are applied by way of inverter 505, inverter 506, the make contacts of relay 1–CR and diode 515 to 100-speed break detector 516. Thus the signals from the 100-speed station are passed to lead 504 and to detector 516 when the station is originating or terminating a call.

*Signal translation*

As previously described, the signals received from the 100-speed station are applied to lead 504 wherein the high signals correspond to received marking signals and the low signals correspond to received spacing signals.

Figure 2:
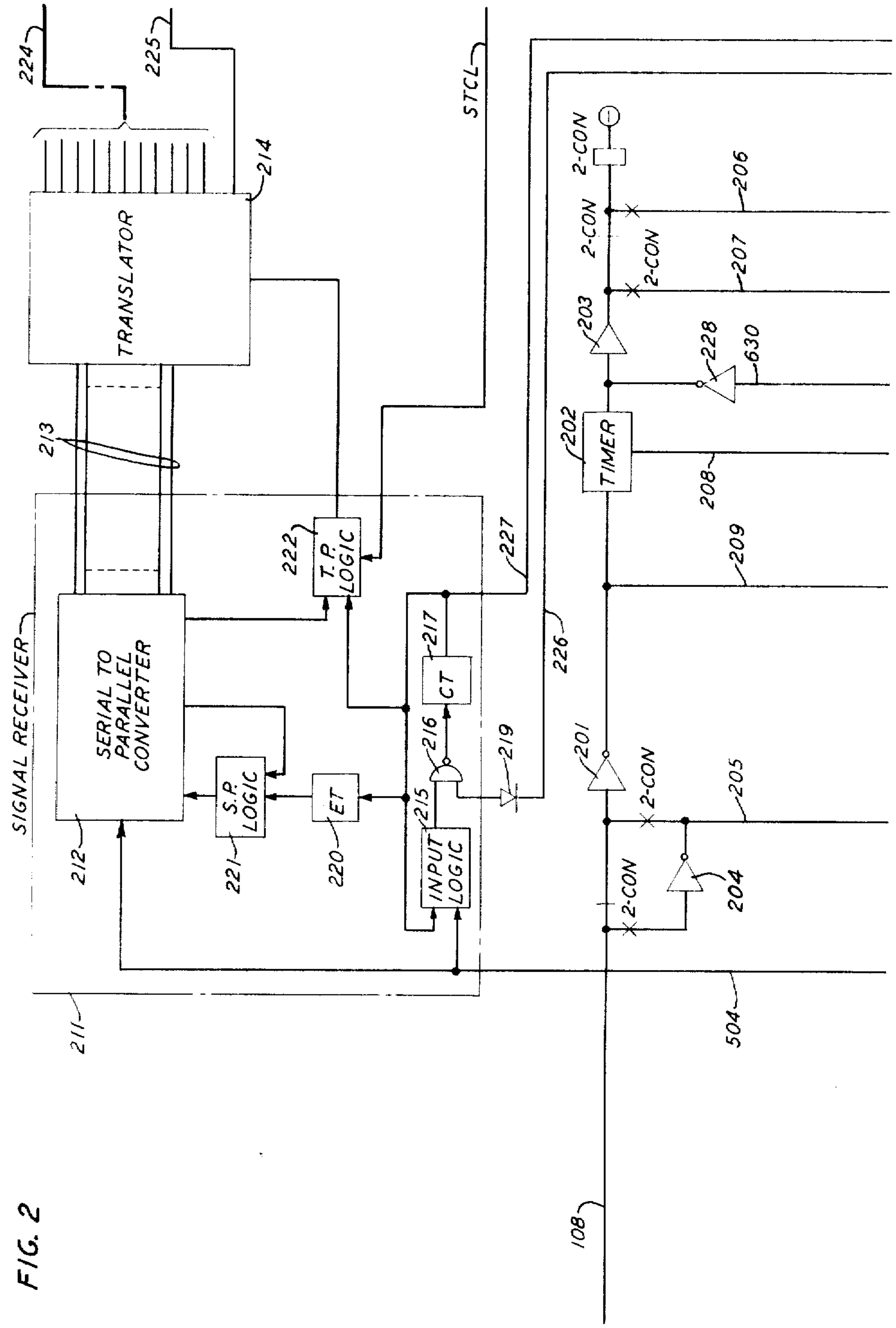
Figure 3:
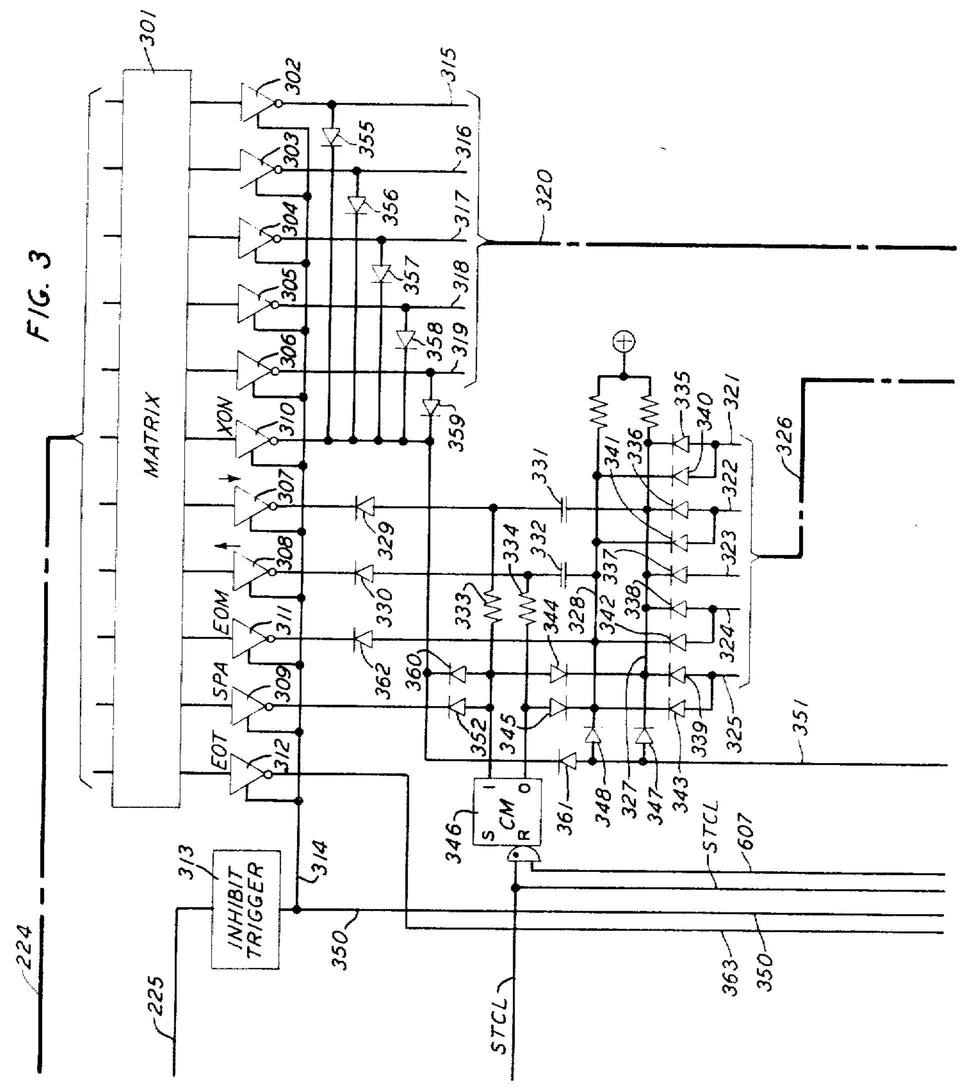

The signals on lead 504 are directly extended to a signal receiving circuit, generally indicated by block 211, FIG. 2. Signal receiving circuit 211 is preferably similar to the arrangement described in a copending application of N. H. Stochel, Serial No. 283,825, concurrently filed herewith which issued as Patent 3,160,876 on December 8, 1964. Signal receiving circuit 211 includes serial-to-parallel converter 212, character timer 217 and element timer 220. In addition, as disclosed in the copending application of N. H. Stochel, signal receiving circuit 211 includes logic circuits for starting character timer 217 if the start signal is received and the character timer is in the idle condition, which logic circuits are generally indicated in FIG. 2 by block 215; logic circuits for providing a "translate" pulse if a complete start element is stored in converter 212 and character timer 217 times out, which logic circuits are generally indicated by block 222; and logic circuits for providing "shift" pulses under control of element timer 220 until the character is fully stored in converter 212, which logic circuits are generally indicated by block 211. Serial-to-parallel converter 212 preferably comprises a multistage shift register, the number of stages corresponding to the number of elements in each character code. The serial elements of each character impressed on lead 504 are applied to the serial-to-parallel converter and shifted through the stages of the converter, as described hereinafter, until, at the conclusion of the character, each stage is storing a corresponding element. When a start element is received, lead 504 goes to the low signal candition, which condition is applied to convert 212 and input logic circuit 215. Assuming character timer 217 is in the quiescent condition, input logic circuit 215 responds to the start signal by applying a high condition signal to inverter gate 216. The other input to inverter gate 216 is connected to lead 226 by way of diode 219 and, as described hereinafter, lead 226 is normally in the high condition. Accordingly, inverter gate 216 applies a low condition signal to character timer 217.

Character timer 217 preferably comprises a monostable multivibrator having a recycling time corresponding to the duration of a 100-speed character. In the initial quiescent condition, the output provided by character timer 217 is a low condition. This initial low condition is recognized by input logic circuit 215 as the quiescent condition. When the spacing signal is received and the low condition signal is applied to character timer 217, character timer 217 provides a high condition output for the interval corresponding to the character. This high condition output is recognized by input logic circuit 215 as an active condition, removing the high signal condition from gate 216. In addition, the high condition output signal of character timer 217 is applied to element timer 220.

Element timer 220 preferably comprises a free-running multivibrator which is maintained in a quiescent condition by the application of a low condition input signal. The removal of the low condition input signal by character timer 217 thus permits element timer 220 to oscillate, the oscillating frequency corresponding to the frequency of the character elements. Accordingly, element timer 220 develops at the output thereof a pulse which occurs at approximately the mid-point of each character element. These pulses are applied to shift pulse logic circuit 221 which produces, in response thereto, the shift pulses to shift the character elements, as previously described.

When the character is fully stored in converter 212, shift pulse logic circuit terminates the application of shift pulses. At about this time, timer 217 times out and the low signal output condition is restored. This stops element timer 220. Assuming that the received code comprises a seven-element code, element timer 220 thus generates eight pulses corresponding to the start element and seven information elements. Accordingly, at the conclusion of the character, the elements are stored in their corresponding shift register stages. In addition, the low signal output condition of character timer 217 prepares input logic circuit 215 to await the reception of the next start signal to again go through the previously-described cycle.

Output leads 213 interconnect the several stages in serial-to-parallel converter 212 to translator 214. Translator 214 may comprise a magnetic core translator similar to the arrangement described in a copending application of G. P. Houcke, Serial No. 214,718, filed August 3, 1962, which issued as Patent 3,219,998 on November 23, 1965. Translator 214 operates upon the application of a translate pulse, which pulse is described below. Upon the application of the translate pulse, translator 214 scans the condition of leads 213 which, as previously described, are connected to the several stages in serial-to-parallel converter 212, by the conditions of the leads corresponding to the received character. In response to the conditions of leads 213, translator 214 applies a positive pulse to a selected one of output leads 224. In addition, a positive pulse is provided to output lead 225.

Returning now to character timer 217, it is noted that the output thereof extends to translate pulse logic circuit 222. Also connected to translate pulse logic circuit 222 is lead STCL which, in turn, is connected to store clock 601, FIG. 6. It is noted at this time that store clock 601 is a conventional clock which generates negative pulses having a frequency rate many times in excess of the signaling frequency rate.

At the termination of the character, character timer 217 provides a high condition to low condition transition. This conditions translate pulse logic circuit 222 to examine converter 212 to determine if a complete start signal is stored therein. Assuming the complete start signal is stored, translate pulse logic circuit 222 utilizes the store clock pulse to provide the previously-identified translate pulse to translator 214. It is thus seen that the translate pulse is applied to translator 214 at the termination of the received character corresponding to the time that the received character elements are stored in their appropriate stages in serial-to-parallel converter 212.

Reviewing the operation of the converter and translator, the reception of the start signal initiates the operation of character timer 217 which, in turn, operates element timer 220. The character is thus stored in serial-to-parallel converter 212. After the termination of the character, the appearance of a clock pulse provides a translate pulse to translator 214, whereby a selected one of leads 224 is energized together with the energization of lead 225. It is noted that the output leads of translator 214 are momentarily energized at approximately the termination of the clock pulse interval due to inherent delay in the translating process.

Leads 224 extend to a matrix, generally indicated by block 301. Matrix 301 preferably comprises a diode matrix which, in response to the energization of a selected one of the input leads, energizes a predetermined permutation of its output leads. As disclosed in FIG. 3, five output leads of matrix 301 extend to buffer amplifiers 302 through 306. Assuming emitter ground is applied to buffer-amplifiers 302 through 306, the energization of the inputs provides a low signal output condition to selected ones of leads 315 through 319. In this manner, the received code applied by leads 213 to translator 214 is translated to a five-element code by the conditioning of leads 315 through 319.

In addition to applying inputs to buffer amplifiers 302 through 306, an input is applied to either buffer amplifier 307 or 308 by matrix 301. This is an indication whether the character is an upper case character or a lower case character. If the character is a lower case character, the input to buffer amplifier 307 is energized, and if the character is an upper case character the input to buffer amplifier 308 is energized.

In the event that the received character corresponds to an end-of-message signal, character leads 315 through 319 are selectively conditioned to correspond to the character "H." In addition, the input to buffer amplifier 311 is energized. This will provide the end-of-message sequence "Figs. H," as described hereinafter.

In the event that a "space" character is received, buffer amplifier 309 is energized and leads 315 through 319 are conditioned to correspond to the character "space." The function of buffer amplifier 309 is described hereinafter. In the event that a special transmitter turn-on character is received, buffer amplifier 310 is energized to the exclusion of the other buffer amplifiers. Similarly, if an end-of-transmission signal is received, buffer amplifier 312 is exclusively energized.

It is recalled that upon the application of the translate pulse, translator 214 provides a pulse to lead 225. The pulsing of lead 225 operates trigger 313, FIG. 3, which provides a momentary ground at the output thereof. This momentary ground is connected by way of lead 314 to buffer amplifiers 302 through 312 whereby the energized ones of the buffer amplifiers are enabled to provide a momentary low signal condition at the outputs thereof.

Since a five-element permutation code requires an additional character to indicate whether the code is in upper case or lower case, whereas the seven-element code does not, the circuit provides for inserting and indicating character. In addition, the indicated character need only be inserted when there is a change in the case of sequential characters. This is provided for by a case memory circuit together with buffer amplifiers 307 and 308.

The case memory circuit includes CM flip-flop 346. When flip-flop 346 is set, it indicates that the previous character was an upper case character, and, conversely, when it is reset, the previous character was a lower case character. Assuming now that flip-flop 346 is set, terminal 1 output is in a high signal condition, which signal condition is applied through resistor 333 to diode 329, whereby diode 329 is forward biased. Conversely, output terminal 0 applies a low signal condition through resistor 334 to diode 330 thereby back biasing the diode.

If an upper case character is received, leads 315 through 319 are selectively energized, as previously described, and buffer amplifier 308 applies a low signal condition to diode 330. Diode 330 is blocked, however, and the signal is not applied therethrough. If the character is a lower case character, the low signal output condition of buffer amplifier 307 is passed by diode 329 since it is forward biased. This negative-going condition is then passed through capacitor 331 to lead 327 and then to leads 321 through 325 by way of diodes 335 through 339, respectively. Accordingly, all of leads 321 through 325 are energized corresponding to the lower case or "letters" signal. In addition, the low signal condition applied to lead 327 is passed through diode 344 to the set output lead of flip-flop 346. This, as previously described, resets flip-flop 346, whereby the indication is provided that the previous character was lower case.

With flip-flop 346 in the reset or lower case memory condition, a low signal is applied through resistor 334 to forward bias diode 330. The reception of an upper case character results in a low condition signal at the output of buffer amplifier 308. This low condition signal is thus passed through diode 300 and capacitor 332 to lead 328. The low signal condition on lead 328 is, in turn, passed to leads 321, 322, 324 and 325 by way of diodes 340, 341, 342 and 343, respectively, whereby leads 321 through 325 are energized in accordance with an upper case or "figures" signal. In addition, the low signal condition of lead 328 is applied through diode 345 to the reset output terminal of flip-flop 346, whereby the flip-flop is returned to the set condition, indicating that the previous character was in the upper case.

The reception of a space character by the receiving teletypewriter restores the teletypewriter to the lower case condition as is well known in the art. Since the receiving teletypewriter is restored to the lower case condition, the circuit provides that a received space character resets flip-flop 346 to the reset or lower case memory condition. This is provided by connecting the output of buffer amplifier 309 to the set terminal output lead of flip-flop 346 by way of diode 352 whereby the energization of buffer amplifier 309 resets flip-flop 346 in the same manner as previously described.

The transmitter turn-on character in the seven-element code corresponds to the two character sequence "blank," "letters" in the five-element code. When the transmitter turn-on character is received, buffer amplifier 310 provides at the output thereof a low signal condition. This low signal condition, in turn, is applied to leads 315 through 319 by way of diodes 355 through 359, whereby a "letters" character is impressed on the signaling leads. In addition, the low output condition of buffer amplifier 310 is passed through diode 360 to the set output terminal of flip-flop 346, placing flip-flop 346 in the reset or "letters" memory condition if it was previously in a set condition. In addition, the low output condition of buffer amplifier 310 is applied by way of diode 361 to lead 351. As described hereinafter, the low signaling condition of lead 351 enables the insertion of a character in the buffer storage.

It is recalled that when a low signal condition is applied to lead 327 a "letters" character is to be inserted. This is enabled by the application of the low signal condition to lead 351 by way of diode 347. Similarly, a low signal condition on lead 328 for the insertion of a "figures" character, as previously described, is also applied to lead 351, but by way of diode 348.

It is noted at this time that the ground pulse output or low signal condition provided by trigger 313 is also applied to lead 350. Lead 350, as described hereinafter, enables the storage of the character impressed on signaling leads 320 in the buffer storage.

Figure 6:
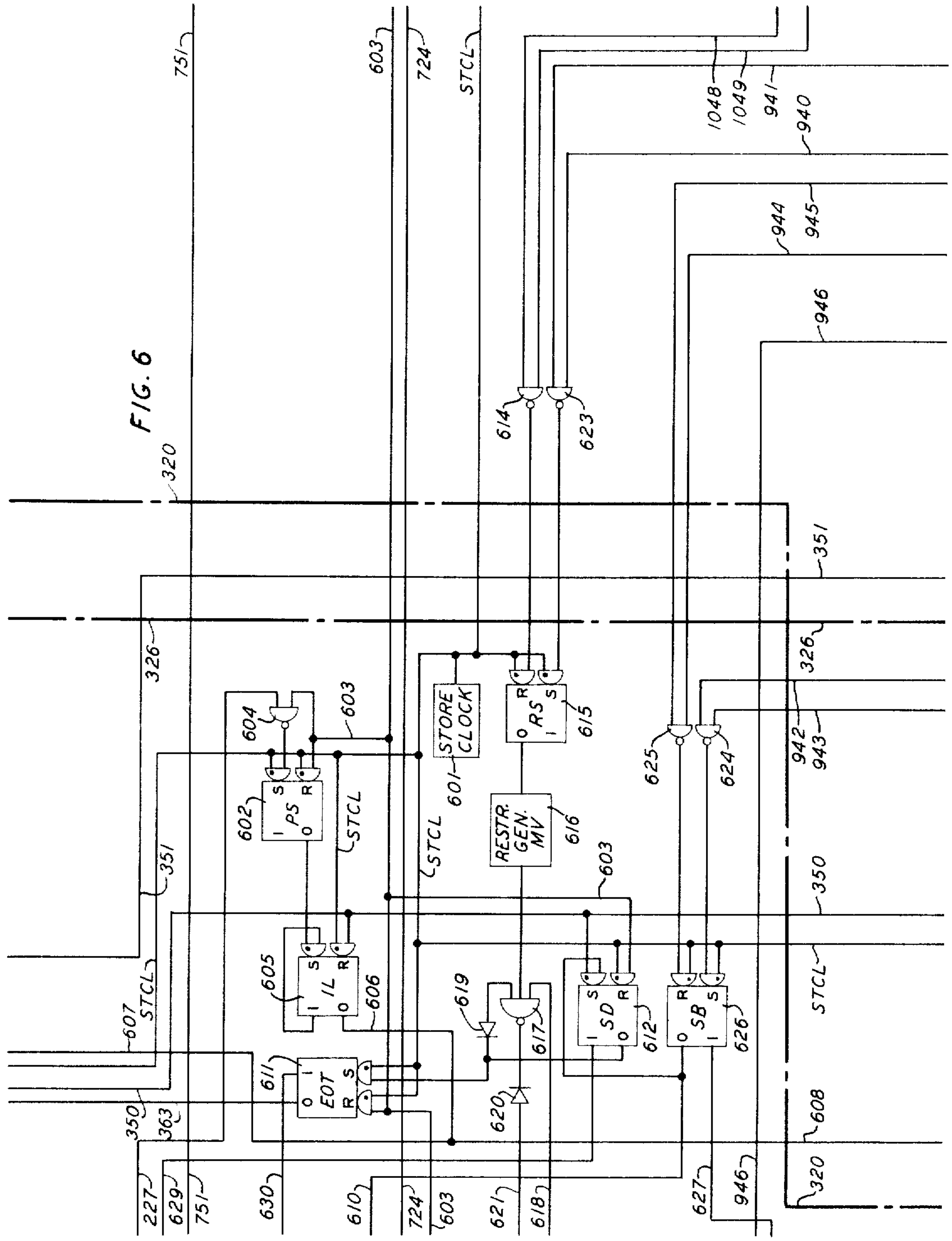

In the initial idle condition, lead 630, FIG. 6, which extends to the enabling lead of the reset gate of P5 flip-flop 602, is in a low condition, as described hereinafter. With the pulsing lead of the reset gate connected to clock lead STCL, flip-flop 602 is initially in the reset condition.

After a connection is completed, lead 603 goes to the high signal condition, as described hereinafter. When the start element of the first character is received, character timer 217 provides a high signal condition at the output thereof, as previously described. This high signal condition is applied through lead 227 to one input of inverter gate 604. Since the other input of inverter gate 604 is connected to lead 603, the gate output goes to the low signal condition enabling the set gate of flip-flop 602. Accordingly, flip-flop 602 is set by a clock pulse and the resultant negative-going transition provided at the reset output terminal is applied to the pulsing input of the set gate of IL flip-flop 605. Flip-flop 605 is thus set and, in turn, applies a low condition to lead 606. The low condition on lead 606 is passed by way of lead 607 to the enabling lead of the reset gate of case memory flip-flop 346, placing the flip-flop in the reset or "letters" memory condition when the clock pulse is applied to the pulsing lead of the gate. In addition, the low condition on lead 606 is applied by way of lead 608 to input terminals 2, 3, 5, 6, 7 and 8 of block 901, which block generally includes stages 19 and 20 of the buffer storage.

*Buffer store*

Figure 9:
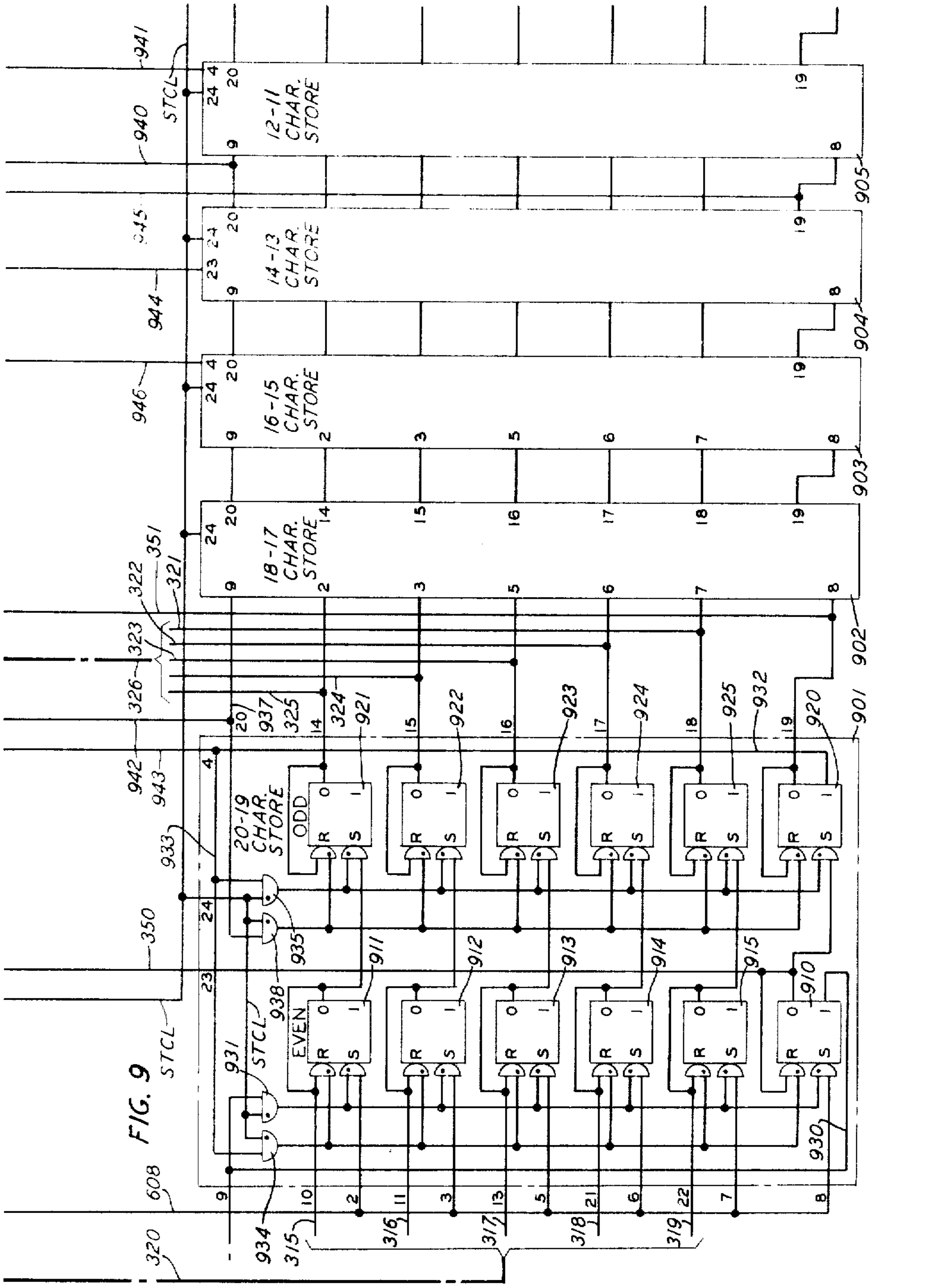
Figure 10:
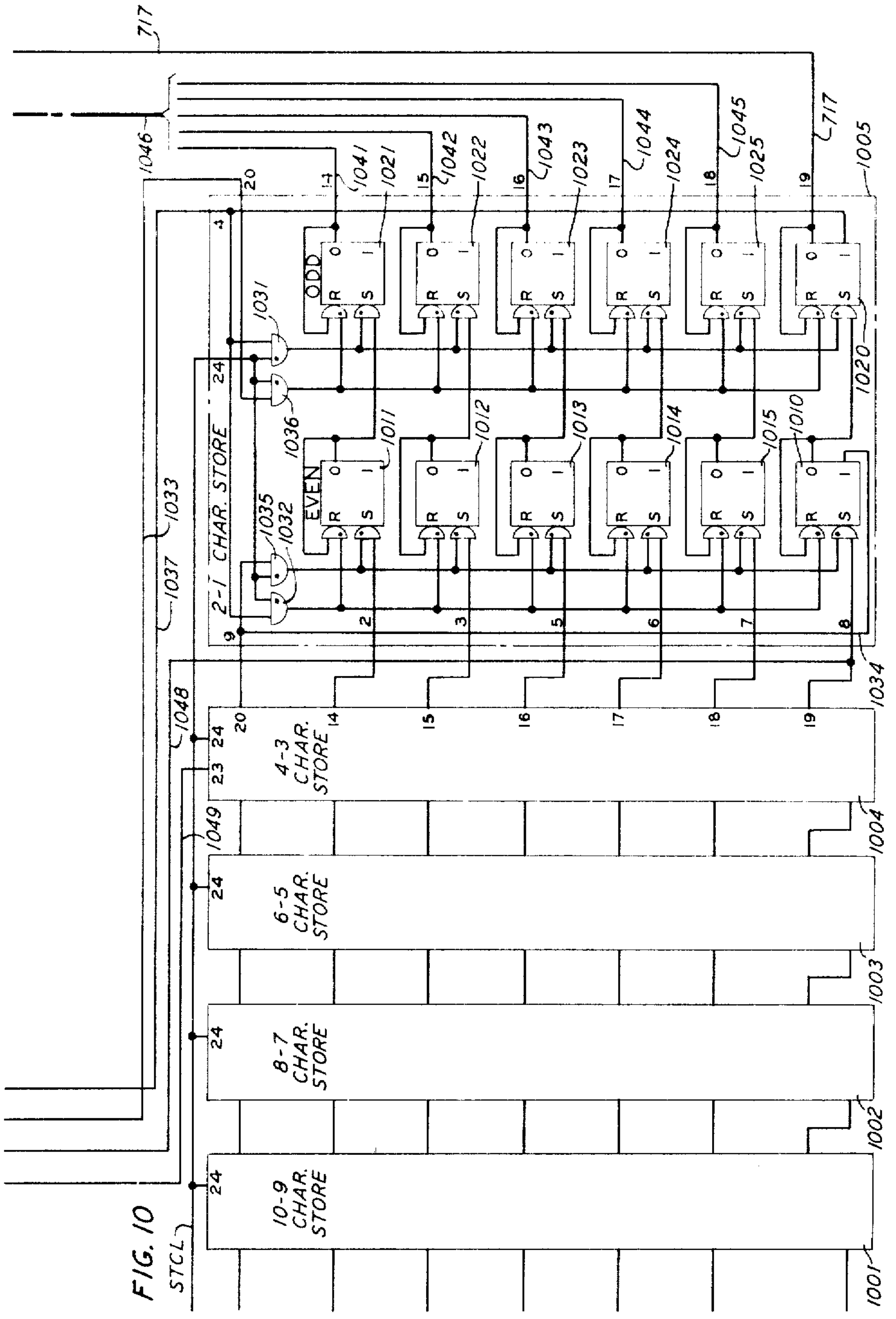

The buffer storage shown in FIGS. 9 and 10, comprises 20 stages. Each adjacent pair of stages, such as stages 19 and 20 shown in block 901, is arranged substantially identically to corresponding pairs of stages, such as stages 1 and 2 shown in block 1005, FIG. 10, and stages 3 through 18, generally indicated by blocks 1004, 1003, 1002, 1001, 905, 904, 903 and 902.

Considering stage 20, flip-flop 910 is utilized as a marker stage and indicates whether a character is stored in storage flip-flops 911 through 915. Similarly, flip-flop 920 in the 19th stage is a marker stage indicating whether a character is stored in flip-flops 921 through 925.

In the initial idle condition, all the flip-flops in the buffer storage are in the reset condition, and with the marker flip-flops, such as 910 and 920, reset, the indication is that the buffer storage is empty. Since flip-flop 910 is reset, the low condition provided at the set output terminal is provided by way of lead 930 to the enabling lead of gate 931. Accordingly, clock pulses on lead STCL pass through gate 931 to the pulsing leads of the input set gates of flip-flops 910 through 915.

It is recalled that when flip-flop 605 is set, a low signal condition is applied to lead 608. Accordingly, this low signal condition is passed to the enabling leads of the set input gates of flip-flops 910 through 915, whereby the clock pulse sets all the flip-flops in the 20th stage. The setting of each of flip-flops 911 through 915 corresponds to the storage of a marking element. Accordingly, with all of the flip-flops set, a simulated "letters" character is stored in the 20th stage.

When flip-flop 910 is set, the previously described enabling condition applied to gate 931 is removed and the low condition applied at the reset output terminal thereof is passed through lead 350 to the enabling lead of the reset input gate of flip-flop 605. Accordingly, flip-flop 605 is reset by the next clock pulse, which clock pulse is applied to the pulsing lead of the reset input gate. In addition, the low signal output condition of flip-flop 910 is applied to the enabling lead of the input set gate of flip-flop 920. Similarly, the low signal output condition of each of flip-flops 911 through 915 is applied to the enabling leads of the input set gates of flip-flops 921 through 925, respectively. Finally, the low condition outputs of flip-flops 910 through 915 are connected to their own input reset gate enabling leads.

Since flip-flop 920 is in the reset condition, the low condition provided at the output set terminal is supplied through leads 932 and 933 to the enabling lead of gate 935 and, in addition, to the enabling lead of gate 934. Accordingly, the next clock pulse is passed through gate 934 to the pulsing leads of the input reset gates of flip-flops 910 through 915 thereby resetting these flip-flops. In addition, the clock pulse is passed through gate 935 to the pulsing leads of the input set gates of flip-flops 920 through 935 thereby setting the 19th stage flip-flops.

In a similar manner, with the 19th stage flip-flop set, the 18th stage flip-flops are enabled to be set in response to the next subsequent clock pulse. In addition, with the marker flip-flop of the 18th stage in the initial reset condition, a low signal is applied to output terminal 9 of storage block 902 and thence by way of lead 937 to the enabling lead of gate 938 whereby the clock pulse that sets the 18th stage flip-flops is also passed through gate 938 to reset the 19th stage flip-flops. In this manner, the "letters" character is passed, stage by stage, by each clock pulse until it is stored in the first stage which comprises flip-flops 1020 through 1025. As described hereinafter, the character stored in the first stage is read out by a parallel-to-serial converter circuit shown in FIG. 7.

When the first character is received by the translator, trigger 313 applies a ground pulse to lead 350 and buffer amplifiers 302 through 306 condition character leads 315 through 319 in accordance with the received character. Assuming that the first character is the letter "E," wherein the first element is the only marking element, lead 315 is the only lead placed in the low signal condition.

The low condition on lead 350 is applied to the reset output terminal of flip-flop 910, which flip-flop, as previously described, constitutes the marker of the 20th stage. With flip-flop 910 in the reset condition, the application of the low condition to the reset output terminal sets flip-flop 910.

Character leads 315 through 319 are connected through cable lead 320 to the output reset terminals of flip-flops 911 through 915, respectively. Accordingly, the low signal condition on lead 315 sets flip-flop 911. It is noted that the low signal condition on lead 315, for example, also extends to the enabling lead of the input set gate of flip-flop 921. Flip-flop 921, however, is not set at this time since, as previously disclosed, the momentary condition applied to lead 315 occurs at approximately the termination of the clock pulse due to the delay in the translation process. In addition, the previously-described delay of the gate precludes the enabling of the set gate of flip-flop 921 until after the termination of the pulse. Accordingly, the energization of lead 315 does not affect the condition of flip-flop 921.

With flip-flop 920 reset, gates 935 and 934 are enabled, as previously described. Accordingly, the next clock pulse sets flip-flops 920 and 921 and resets flip-flops 910 and 911 in the same manner as previously described. Accordingly, each clock pulse passes the character "E" stage by stage until the character reaches the 2nd stage, which comprises flip-flops 1010 through 1015, wherein flip-flops 1010 and 1011 are set. Assuming that the "letters" character is stored in the first stage, gates 1031 and 1032 are disabled. Accordingly, the 2nd stage flip-flops 1010 through 1015 cannot be reset by the clock pulse and the characters stored in the 2nd stage cannot be passed to the 1st stage by the clock pulse. Similarly, with characters in the 1st and 2nd stage and flip-flop 1010 in the set condition, providing a high condition to lead 1034 which lead extends to terminal 20 of character store block 1004, the storage of a subsequent charcter by the buffer store queues up behind the "letters" character and the "E" character. Accordingly, subsequently received characters queue up by filling subsequent stages so long as the prior stage retains a character.

Assuming now that a character sequence is provided by the translator, such as the end-of-message sequence, "Figures-H," the character "H" is conditioned upon character leads 315 through 319, a ground pulse is applied to lead 350, a "figures" character is applied to leads 321 through 325 by buffer amplifier 311, and a low signal condition or ground pulse is applied to lead 351, as previously described. The conditioning of leads 315 through 319 and the application of the ground pulse to lead 350 stores the character "H" in the 20th stage and sets flip-flop 910 in the same manner as previously described. The application of the ground pulse to lead 351, which lead extends to the reset output terminal of flip-flop 920, sets this flip-flop. Since leads 321 through 325 are connected by way of cable 326 to the reset output terminals of flip-flops 921 through 925, respectively, flip-flops 921, 922, 924 and 925 are set, whereby a "figures" character is stored in the 19th stage.

Since gate 938 is enabled by the marker flip-flop in the 18th stage, the next clock pulse resets the 19th stage and passes the "figures" character to the 18th stage. Gates 934 and 935, however, are disabled by the set condition of flip-flop 920, whereby the character "H" remains stored in the 20th stage. On the next clock pulse, however, with flip-flop 920 reset, the character "H" is passed from the 20th stage to the 19th stage. It is noted that this clock pulse also passes the "figures" character from the 18th stage to the 17th stage. Accordingly, the subsequent clock pulses pass the two characters through the buffer storage stages until they queue up in the same manner as previously described.

*Storage readout*

Figure 7:
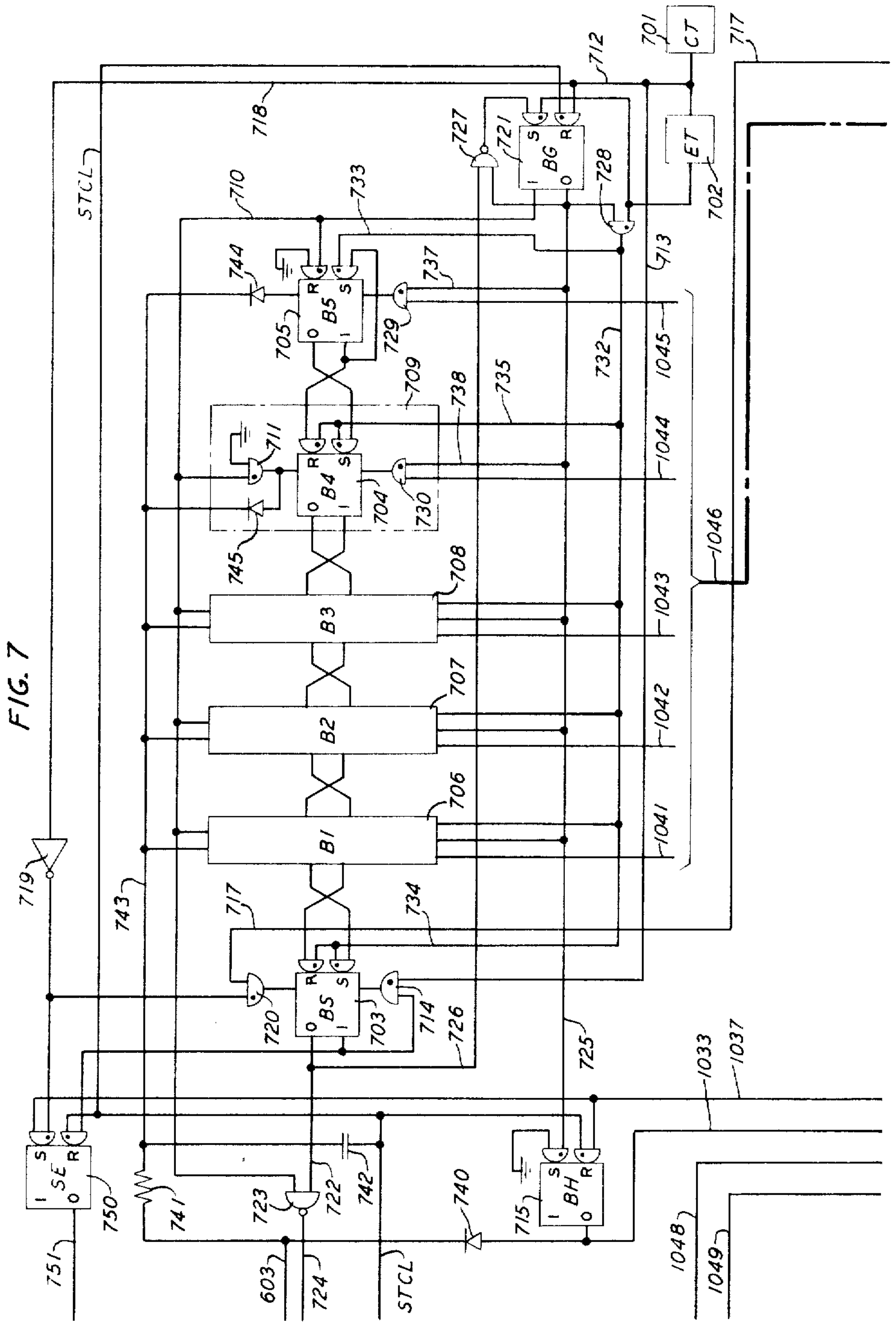

The readout circuit for the buffer store is shown in FIG. 7. The circuit is arranged as a shift register and includes a first stage, BS, for inserting a simulated spacing start signal and succeeding stages B1 through B5 for reading the information from the first stage of the buffer store. In addition, a character timer, generally indicated by block 701, is included to provide framing signals. Character timer 701 preferably comprises a free-running multivibrator having a frequency corresponding to the frequency of 60-speed characters. The output provided by each cycle of character timer 701 comprises, in sequence, a high condition having an interval identical to the duration of the start-space element, the five information elements and a portion of the stop-mark element of a 60-speed character, and a low output condition corresponding to the remaining duration of the mark stop interval.

The output of character timer 701 extends to element timer 702 which preferably comprises a free-running multivibrator maintained in a quiescent condition by the application of a low condition input signal. Removal of the low condition input signal by character timer 701 permits element timer 702 to oscillate, the oscillating frequency corresponding to the frequency of the character elements whereby seven pulses are provided during the character interval.

As previously described, the readout shift register includes a first stage BS, which stage comprises a flip-flop generally indicated by block 703. The succeeding four stages, which read out the first four character elements of the stored character, are indicated by blocks 706 through 709 and the final stage includes flip-flop 705. Stages 706 through 708 are substantially identical to stage 709, each including a flip-flop corresponding to flip-flop 704, gates corresponding to gates 711 and 730 and a diode corresponding to diode 745.

In the initial idle condition, BG flip-flop 721, FIG. 7, and BH flip-flop 715 are in the reset condition. BS flip-flop 703 is initially in the set condition and the five subsequent stages in the shift register are reset. With flip-flop 703 set, the reset output terminal provides a low signal condition by way of lead 722 to inverter gate 723. Accordingly, output lead 724 is in the high signal condition corresponding to a marking signal.

Assuming now that a character is received by the buffer store and passed down to the first stage thereof, flip-flop 1020 is set, as previously described. This provides a low condition at the reset output terminal thereof, which low condition is applied by way of lead 717 to gate 720, whereby the gate is enabled. At the beginning of the next framing pulse developed by character timer 701, the resultant positive-going transition is applied by way of leads 712 and 718 to inverter 719. The resultant negative-going transition at the output of inverter 719 is passed by gate 720 to the reset input terminal of flip-flop 703. The consequent resetting of flip-flop 703 results in a high condition at the reset output terminal which high condition is applied by way of lead 722 to inverter gate 723. The other input terminal of inverter gate 723 is in the low condition, however, since it is connected by way of lead 710 to the set output terminal of flip-flop 721, which flip-flop is reset, as previously described. Accordingly, at this time lead 724 is maintained in the high condition corresponding to the idle marking signal.

The high condition at the reset output terminal of flip-flop 703 is also extended by way of lead 726 to inverter gate 727. Since the other input lead to inverter gate 727 has a high condition applied thereto by the reset output terminal of flip-flop 721, a low signal output condition is provided, which low signal enables the set input gate of flip-flop 721.

Recalling now that element timer 702 starts to oscillate upon receiving the framing pulse, the first negative element timing pulse is passed by the now enabled set input gate of flip-flop 721, thereby setting the flip-flop. With flip-flop 721 set, the consequent high condition provided at the set output terminal and passed by lead 710 to inverter gate 723 results in a low condition output on lead 724. This corresponds to the initiation of the spacing start signal.

The negative-going transition at the reset output terminal of flip-flop 721 is applied by way of lead 737 to the pulsing input of gate 729. Similarly, this negative pulse is applied by way of lead 738 to the pulsing input of gate 730 and to the corresponding gates in stages 706 through 708 of the shift register. In addition, the negative pulse is provided by way of lead 725 to the input pulsing lead of the set gate of flip-flop 715 and with the gate normally enabled by ground, flip-flop 715 is set. Finally, the setting of flip-flop 721 applies the low condition at the reset output terminal to gate 728, whereby the gate is enabled.

Recalling now that the first character stored in the buffer store is the "letters" character, whereby all the flip-flops in the first stage are set. Accordingly, the reset output terminals of flip-flops 1021 through 1025 are in the low signal conditions, which conditions are applied to leads 1041 through 1045, respectively. Lead 1045 extends through cable 1046 to gate 729, enabling the gate. Similarly, lead 1044 extends through cable 1046 to gate 730, enabling this gate. In a similar manner, the corresponding gates in stages 706 through 708 are enabled. Accordingly, it is seen that the previously-described negative transition derived from the output reset terminal of flip-flop 721 is passed through gates 729, 730 and the corresponding gates in stages 706 through 708 to the set input terminals of flip-flops 705, 704 and the corresponding flip-flops in stages 706 through 708, thereby setting all the flip-flops. It is thus seen that the storage of a mark signal element in the buffer store sets a corresponding stage in the shift register.

With the flip-flop 715 set, as previously described, the low output condition at the reset output terminal is applied through lead 1033 to enable gate 1036. With gate 1036 enabled, the next subsequent store clock pulse resets flip-flops 1020 through 1025, as previously described. The resetting of flip-flop 1020 produces a low signal condition on the set output terminal, which condition is applied by way of leads 1030 and 1037 to the enabling lead of the reset input gate of flip-flop 715. Accordingly, the next subsequent store clock pulse resets flip-flop 715 and the consequent high signal condition at the reset output terminal disables gate 1036. In addition, with the first stage of the buffer store empty, the clock pulse which resets flip-flop 715 also advances any character stored in the second stage to the first stage.

The second element timing pulse is passed through gate 728 since the gate is now enabled, as previously described. This negative pulse is applied through lead 733 to the set input gate of flip-flop 705. Since the said input gate is enabled if flip-flop 705 is in the reset condition, it is noted that flip-flop 705 is invariably placed in the set condition by the application of an element timing pulse.

The element timing pulse applied through gate 728 is also connected by way of leads 732 and 735 to the pulsing leads of the input set gate and the input reset gate of flip-flop 704. Since the set output lead and the reset output lead of flip-flop 705 are connected to the reset input gate and the set input gate, respectively, of flip-flop 704, it is thus seen that flip-flop 704 is reset by the element timing pulse if flip-flop 705 is reset and set by the element timing pulse if flip-flop 705 is set. Accordingly, since flip-flop 705 was previously set by the readout of the "letters" signal from the first stage of the buffer store, the element timing pulse tends to set flip-flop 704. Flip-flop 704 was previously in the set condition in response to the "letters" readout. The element timing pulse thus maintains flip-flop 704 in the set condition by shifting the condition of the flip-flop 705 to flip-flop 704. In a similar manner, the condition of flip-flop 704 is shifted to the corresponding flip-flop in stage 708, the condition of the flip-flop in stage 708 is shifted to the flip-flop in stage 707 and the condition of the flip-flop in stage 707 is shifted to the flip-flop in stage 706. The condition of the flip-flop in stage 706 is correspondingly shifted to flip-flop 703, since the element timing pulse is applied by way of lead 734 to the reset input gate and set input gate of flip-flop 703.

With flip-flop 703 now in the set condition, resulting from the previous set condition of the flip-flop in stage 706, the low condition at the reset output terminal produces a high condition on output signaling leads 724. This corresponds to the first marking element of the "letters" character. In a similar manner, the next four element timing pulses shift the elements of the "letters" character to flip-flop 703, whereby the character is fed serially to output signaling lead 724. In addition, each element pulse maintains flip-flop 705 in the set condition, whereby the flip-flops in stages 706 through 709 are set after the termination of the 6th element timing pulse.

The 7th element timing pulse now shifts the condition of flip-flop stage 706 to flip-flop 703. Since, as previously described, stage 706 is in the set condition, flip-flop 703 is invariably set by the 7th pulse. This condition insures that lead 724 is placed in the marking condition to stimulate the stop element.

Character timer 701 returns to the low signal output condition after the generation of seven-element timing pulses, as previously described. This disables element timer 702 halting the generation of the element timing pulses. The negative-going transition at the output of character timer 701 is applied through lead 713 to the pulsing input of gate 714. Since the enabling input lead of gate 714 is connected to the set output terminal of flip-flop 703, the negative transition of the character timing pulse passes to the set input terminal of flip-flop 703 if the flip-flop is reset, thereby restoring flip-flop 703 to the set condition if not already in that condition. In addition, the negative output condition of character timer 701 is applied by way of lead 712 to enable the reset input gate of flip-flop 712. Accordingly, the next clock pulse is passed through the reset input gate to reset flip-flop 721.

The resetting of flip-flop 721 removes the enabling potential applied to gate 728, disabling the gate. The negative-going transition at the set output lead of flip-flop 721 is applied by way of the reset input gate of flip-flop 705 to reset the flip-flop. This negative-going transition is also applied by way of lead 710 through gate 711 to reset flip-flop 704. In a similar manner, the negative transition resets the corresponding flip-flops in stages 706 through 708. In addition, the negative potential on lead 710 is applied to inverter gate 723 to maintain output signaling leads 724 in the high condition, corresponding to the idle marking signal. It is thus seen that during a cycle of the character timer the character in the first stage of the buffer store is read out and applied serially to signalling lead 724.

On the next framing pulse from character timer 701, the new character in the first stage of the buffer store is read out in substantially the same manner as previously described. In the event, however, that the first stage of the buffer store is empty, the reset output terminal of flip-flop 1020 is in the high signal condition, which condition is applied by way of lead 717 to gate 720. This disables gate 720, precluding the previously-described reset of flip-flop 703 upon the initiation of the character timer framing pulse, whereby a readout of the buffer storage is not provided. Accordingly, whenever a character is advanced to the first stage of the buffer store, the character is read out and passed serially to lead 724.

As previously described, the character signal elements in serial form are applied to lead 724 wherein the high condition thereon corresponds to marking and the low condition corresponds to spacing. If the originating station comprises a 60-speed data set, relay 1–CR is operated, as previously described. The signals on lead 724 are thus passed through the make contacts of relay 1–CR, FIG. 5, to lead 517 and lead 517, in turn, extends to an input terminal of inverter gate 411, FIG. 4. The other two input terminals of inverter gate 411 are connected to leads 518 and 519, which leads are normally in the high signal condition, as described hereinafter. Accordingly, the application of a marking element to lead 724 sets the three input terminals of inverter gate 411 in the high input condition, resulting in a low signal condition at the output thereof. Conversely, the application of a spacing signal to lead 723 provides a low signal condition by way of lead 517 to an input terminal of inverter gate 411,, resulting in a high signal condition at the output thereof.

The output of inverter gate 411 is connected by way of lead 412 to terminal 10 of modulator 101 and then by way of resistor 118 to the base of transistor 111. Assuming a marking signal is applied to lead 724, a low signal condition is applied by way of lead 412 to resistor 118 whereby negative battery applied by way of resistor 119 to the base of transistor 111 turns the transistor ON. As previously described, with transistor 111 turned ON, inductor 113 in the emitter-to-collector circuit of transistor 111 is thereby inserted in the tank circuit of transistor 102, thus producing a marking signal in the $F_2$ frequency band. If a spacing signal is applied to lead 724, the high signal condition consequently applied to lead 412 is passed through resistor 118 to turn transistor 111 OFF. Accordingly, inductor 113 is removed from the tank circuit and transistor oscillator 102 produces a spacing signal in the $F_2$ frequency band. Modulator 101 thus generates a marking or spacing frequency in accordance with the character elements applied to lead 724.

Figure 4:
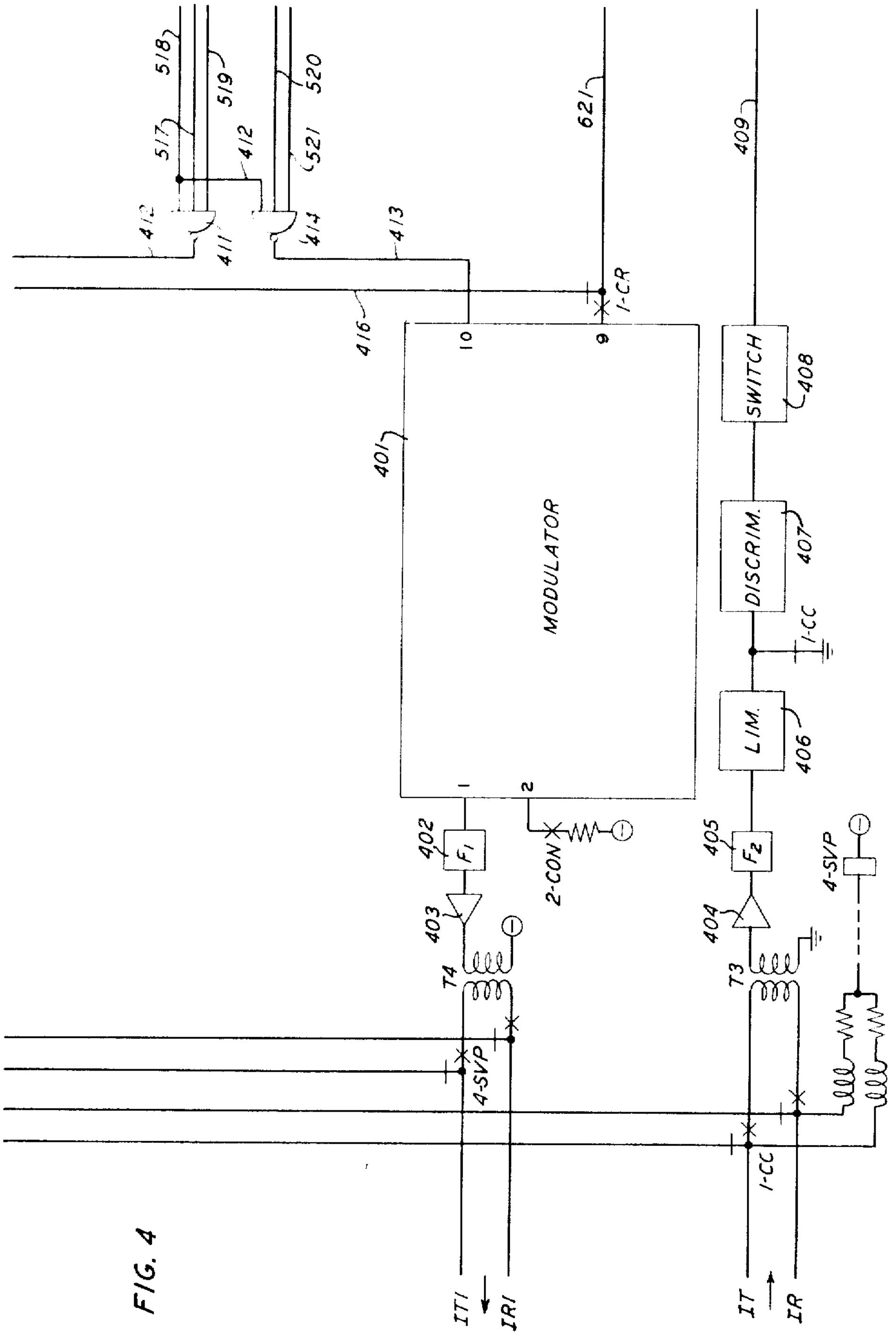

If the originating station comprises a 100-speed data set, relay 1–CR is released, as previously described, and lead 724 extends those break contacts of relay 1–CR to lead 520 which, in turn, extends to an input of inverter gate 414, FIG. 4. The other two inputs to gate 414 are connected to leads 412 and 521 and lead 412, in turn, extends to lead 518. As described hereinafter, leads 518 and 521 are normally in the high signal condition. Accordingly, the application of a marking signal to lead 724 provides a high signal condition to an input of inverter gate 414 by way of lead 520, thereby producing a low signal condition at the output thereof. Conversely, a spacing signal applied to lead 724 results in a high signal condition at the output of inverter gate 414.

The output of inverter gate 414 is connected by way of lead 413 to terminal 10 of modulator 401. Accordingly, a low condition marking signal on lead 413 turns ON the transistor in modulator 401 corresponding to transistor 111 in modulator 101, and conversely, a high condition spacing signal turns OFF the transistor in modulator 401 corresponding to transistor 111. Accordingly, the application of a marking signal produces a marking frequency at terminal 1 of modulator 401 and the application of a spacing signal produces a spacing frequency at terminal 1 in substantially the same manner as previously described for modulator 101.

*Communication break*

In the event that a "break" signal is received from one station, it must be regenerated and passed on to the other station. In addition, any character signals being stored must be erased to preclude the subsequent transmission of the stored signals.

Assuming that a "break" signal is received from the 60-speed station, break detector 514 times out, as previously described, and the output thereof, which is normally in the high signal condition, is transferred to a low signal condition. At the conclusion of the "break" signal, the received marking signal removes the low condition input to break detector 514 and the output of break dtector 514 restores to the normal high signal condition. This results in a positive-going impulse through capacitor 523 to the input of 100-speed break sender 524.

Break sender 524 comprises a monostable multivibrator which, in response to a positive-going impulse, generates a low condition signal at the output thereof for an interval corresponding to the duration of a 100-speed "break" signal. Accordingly, a low condition spacing "break" signal is applied to lead 525.

Assuming that the originating station is the 100-speed station, relay 1–CR is released and lead 525 extends through the break contacts of relay 1–CR to lead 519. As previously described, lead 519 extends to an input of inverter gate 411. Accordingly, the application of a low condition spacing signal to lead 519 results in a high signal condition on lead 412. As previously described, the high condition on lead 412 produces a spacing frequency in the $F_2$ frequency band at output terminal 1 of modulator 101. Accordingly, a spacing signal is regenerated and transmitted to the originating 100-speed station.

If the 60-speed station is the originating station, relay 1–CR is operated and lead 525 extends through the make contacts of relay 1–CR to lead 521 which, as previously described, extends to an input of inverter gate 414. The low condition "break" signal thus provides a high condition on lead 413 resulting in a spacing frequency in the $F_1$ frequency band at output terminal 1 of modulator 401.

The generation of the "break" signal also results in an "off normal" condition which clears the 100-speed to 60-speed store. This function is provided by passing the low condition at the output of break sender 524 through diode 526 to lead 527.

In the initial idle condition, with relay 2–CON released, ground is applied to lead 527 through the break contacts of relay 2–CON. This low signal condition on lead 527 is applied to inverter 529 resulting in a high signal condition at the output thereof. The output of inverter 529 extends to one input of inverter gate 530 and the other input of inverter gate 530 is connected to lead 610. Lead 610 is normally in the high signal condition, as described hereinafter, whereby the high signal condition at the output of inverter 529 results in a low signal condition at the output of inverter gate 530. The output of inverter gate 530 is connected to lead 226 and to lead 603. As previously described, with lead 226 in the low signal condition, this low condition is applied by way of diode 219 to inverter gate 216, whereby character timer 217 is maintained disabled. In addition, as previously described, the low signal condition applied to lead 603 provides an enabling potential to the reset gate of PS flip-flop 602, whereby the flip-flop is initially in the reset condition.

Upon the operation of relay 2–CON during the connect sequence, ground is removed from lead 527 and positive battery is applied thereto by way of resistor 528. This produces a low signal condition at the output of inverter 529 driving the output of inverter gate 530 to the high signal condition. This condition is thus applied to lead 226 removing the disabling potentional from inverter gate 216 and to lead 603, removing the enabling potential from the reset gate of PS flip-flop 602 and applying a high signal condition to an input of inverter gate 604, as previously described. This enables character timer 217 and sets PS flip-flop 602 when the start element of a character is received, as previously described. Accordingly, the 100-speed to 60-speed converter is thus placed in condition to receive and store received signals.

Recalling now that the generation of a "break" signal by break sender 524 applies a low signal condition through diode 526 to lead 527, this low signal condition produces a high signal condition at the output of inverter 529. Since lead 610 is normally in the high signal condition, the high signal condition at the output of inverter 529 results in a low signal condition at the output of inverter gate 530. The consequent application of a low signal condition to lead 226 is passed through diode 219 to inverter gate 216, whereby character timer 217 is disabled. Accordingly, serial-to-parallel converter 212 is not provided with element timing pulses, blocking input signals derived by way of lead 504.

The low signal condition at the output of inverter gate 530 is also applied to lead 603. This resets PS flip-flop 602, as previously described. In addition, the low signal condition on lead 603 is applied to the enabling input of the reset gate of EOT flip-flop 611 and to the enabling input of the reset gate of SD flip-flop 612. Accordingly, flip-flops 611 and 612 are reset if these flip-flops were previously set. The functions of flip-flops 611 and 612 are described hereinafter.

The low signal condition on lead 603 also extends to the reset output terminal of BH flip-flop 715, FIG. 7, by way of diode 740 and maintains it in the set condition. Accordingly, a low signal condition is applied to lead 1033. As previously described, with a low signal condition on lead 1033, the clock pulse resets the first stage of the buffer store. This removes the character stored in the 1st stage of the buffer store and enables the shifting of the character in the 2nd stage to the 1st stage, as previously described. Since the low signal condition is maintained on lead 1033 by lead 703, the first stage is again reset. Accordingly, the characters, if any, stored in the buffer store move up to the first stage and are erased by the resetting of the first stage. Thus the characters stored in the buffer store are all removed.

The low signal condition on lead 603 is also applied by way of resistor 741, FIG. 7, to lead 743. Lead 743, in turn, is connetced to diode 744, to diode 745 in stage 709, and to the diodes in stages 706 through 708 corresponding to diode 745. Accordingly, the low signal condition on lead 743 forward biases diodes 744, 745 and the diodes corresponding to diode 745. Clock pulse lead STCL is connected by way of capacitor 742 to lead 743. Accordingly, the application of a clock pulse through capacitor 742 is passed by diode 744 to the reset input terminal of B5 flip-flop 705, resetting the flip-flop if it was previously set. This clock pulse is also passed by way of diode 745 to the input reset terminal of B4 flip-flop 704, resetting this flip-flop if it was previously set. Similarly, the clock pulse resets the corresponding flip-flops in stages 706 through 708. Accordingly, the low condition on lead 603 results in the erasure of a character that might be stored in the shift register comprising flip-flops B1 through B5.

Assuming that a "break" signal is received from the 100-speed station, break dectector 516 times out, as previously described, resulting in a low signal condition at the output thereof. When the marking signal is received at the termination of the break signal, the output of break detector 516 returns to the high signal condition, providing a positive-going pulse through capacitor 532 to the input of 60-speed break sender 533.

Break sender 533 comprises a monostable multivibrator which, in response to a positive-going impulse, provides a low signal condition to the output thereof having a duration corresponding to the "break" signal interval of a 60-speed station. Accordingly, a low signal condition corresponding to a "break" signal is applied through the break contacts of relay 5-CL to lead 534. Assuming that the originating station is a 60-speed station, lead 534 extends through the make contacts of relay 1–CR to lead 519. Thus, a low condition is applied through lead 519 which, as previously described, results in a spacing frequency at output terminal 1 of modulator 101. Conversely, if the originating station is a 100-speed station, relay 1–CR is released and lead 534 extends to lead 521. Thus, as previously described, the application of a low signal condition to lead 521 results in the generation of spacing frequency at output terminal 1 of modulator 401. Accordingly, the reception of a "break" signal from the 100-speed station results in the transmission of a "break" signal to the 60-speed station.

The low signal condition at the output of break sender 533 is also applied to lead 527 by way of diode 535. The generation of a "break" signal by break sender 533 results in the "off normal" condition, as previously described. As previously described, the application of a low signal condition to lead 527 provides a low signal condition at the output of inverter gate 530. This, as previously described, results in the "off normal" condition which disables character timer 217, blocking the operation of serial-to-parallel converter 212, erases the characters stored in the buffer store, resets the shift register comprising stages B1 through B5, and resets PS flip-flop 602, EOT flip-flop 611 and SD flip-flop 612 if these flip-flops were previously in the set condition.

After the termination of the regenerated "break" signal, lead 527 is restored to the high condition, restoring, in turn, leads 226 and 603 to the normal low condition. This re-enables character timer 217 and discontinues the erasure of the buffer store and read-out flip-flops. When the next character is received from the 100-speed station, PS flip-flop 602 is again set, as previously described, whereby IL flip-flop 605 is set. The setting of flip-flop 605 resets CM flip-flop 346 and inserts the "letters" character in the buffer store and the buffer store proceeds to store the received characters in the same manner as previously described. Accordingly, the first character transmitted after the "break" signal is a "letters" character so that the translator converter and the receiving set are in the lower case condition.

*The restraint signal*

Continuous transmission from the 100-speed set tends to fill the buffer storage. In this event the converter is arranged to advise the transmitting set to momentarily interrupt transmission by returning a "restraint" signal comprising a frequency shift tone signal superimposed on the idle marking tone normally transmitted to the sending set. This frequency shift signal comprises a shift in the marking tone toward the spacing tone frequency.

Assuming now that the characters queue up in the buffer storage through the 11th stage, the marker flip-flop in the 11th stage sets. This provides a high signal condition to output terminal 4 of character store block 905 and terminal 4, in turn, is connected by way of lead 941 to one input of inverter gate 623. When the next character is received, it is stored in the 12th stage and the marker flip-flop therein provides a high signal condition to terminal 9 of character store block 905. Terminal 9 is connected by way of lead 940 to the other input of inverter gate 623. With the two inputs of inverter gate 623 in the high signal condition, the consequent low condition output of the gate enables the input set gate of RS flip-flop 615. Accordingly, the next clock pulse applied to the input set gate sets flip-flop 615.

The reset output terminal of flip-flop 615 is connected to the input of "restraint" generator multivibrator 616. Multivibrator 616 preferably comprises a free-running multivibrator having a frequency corresponding to the signaling speed of the 100-speed set. With flip-flop 615 normally in the reset condition, the high signal output at the reset terminal maintains multivibrator 616 disabled and the output thereof at the low signal condition. When flip-flop 615 is set, however, the reset output terminal goes to the low signal condition enabling multivibrator 616. This provides at the output of multivibrator 616 alternate high signal and low signal conditions at the data signal rate.

The output of multivibrator 616 extends to one input of inverter gate 617. Another input of inverter gate 617 is connected by way of diode 619 to the reset output terminal of SD flip-flop 612. Since SD flip-flop 612 is normally in the reset condition, this other input to inverter gate 617 does not have provided thereto a low condition signal. A third input to inverter gate 617 is connected to lead 618 which, in turn, extends to the output of 100-speed break sender 524. As previously described, the output of break sender 524 is normally in the high condition signal.

Recalling now that the output of multivibrator 616 is in the low condition when disabled, the previously-described enabling of multivibrator 616 provides alternate high condition and low condition signals at the output thereof. Accordingly, each high condition output signal of multivibrator 616 results in a low condition at the output of inverter gate 617. This low condition is applied by way of diode 620 and lead 621 to contacts of relay 1–CR shown in FIG. 4.

Assuming now that the 100-speed station originated the call, relay 1–CR is released and lead 621 is connected through the break contacts of relay 1–CR and lead 416 to terminal 9 of modulator 101. In the initial condition, with the output of inverter gate 617 at the high condition, the signal to lead 416 is blocked by diode 620. Since lead 416 extends to the base of transistor 112, the transistor is thus rendered nonconductive by positive battery applied through resistor 121. The application of the low signal or ground condition to lead 416, however, eliminates the application of positive battery through resistor 121, and transistor 112 is rendered conductive by negative battery applied through resistor 122.

The collector of transistor 112 is connected by way of capacitor 123 to the tank circuit of transistor oscillator 102. When transistor 112 is nonconductive, capacitor 123 is open circuited and thereby removed from the tank circuit. The application of the low potential to lead 416, however, renders transistor 112 conductive, as previously described, thereby extending ground through the emitter-to-collector path of transistor 112 to capacitor 123. This places capacitor 123 in the tank circuit of transistor oscillator 102, reducing the output frequency. The shift of the output frequency is preferably less than one-half of the shift toward the spacing frequency and constitutes the "restraint" signal. Accordingly, the "restraint" signal comprises alternate periods of marking tone and a frequency shift tone superimposed on the marking tone. This "restraint" signal is passed through terminal 1 of modulator 101 and thence to the 100-speed station.

The remote 100-speed station, not shown, is preferably arranged to recognize the "restraint" signal. A suitable arrangement to recognize the signal is disclosed in the above-identified copending application of T. L. Doktor, concurrently filed herewith, wherein means are provided to advise the sending operator that a "restraint" signal has been received from the converter. Accordingly, it is assumed that the operator will refrain from further transmission until the "restraint" signal is removed.

At the converter, the outgoing signals will be continued to be read out of the buffer store. Assuming that no further signals are received from the 100-speed station, the higher numbered stages will gradually be cleared. When the last character is cleared out of the 4th stage, the marker flip-flop therein is reset, providing a high signal condition to terminal 23 of character store block 1004. This high signal condition is passed by way of lead 1049 to one input terminal of inverter gate 614. The subsequent clearing of stage 3 resets the marker flip-flop therein and thus provides a high signal to terminal 19 of character store block 1004. This latter high signal condition is passed by way of lead 1048 to the other input terminal of inverter gate 614. The output of inverter gate 614 is thus placed in the low signal condition, enabling the input reset gate of RS flip-flop 615. Accordingly, the next clock pulse resets flip-flop 615 which, in turn, applies a high signal condition to the input of multivibrator 616, disabling the multivibrator. With multivibrator 616 disabled, the output thereof is restored to the normal low signal condition and transistor 112 is again maintained nonconductive. This terminates the "restraint" signal, advising the 100-speed operator that normal transmission may be resumed.

Assuming that the 100-speed station is the terminating station, relay 1–CR is operated, as previously described, whereby lead 621 extends through make contacts of relay 1–CR to terminal 9 of modulator 401. Since terminal 9 of modulator 401 extends to the transistor corresponding to transistor 112, modulator 401 sends the "restraint" signal to the 100-speed terminating station in the same manner that modulator 101 transmits the "restraint" signal.

*Store break*

Assuming now that the 100-speed operator ignores the "restraint" signal or that due to some line or circuit failure the "restraint" signal is not received by the 100-speed set, continued transmission will continue to fill the buffer store.

When the characters in the buffer store queue up through the 18th stage, the marker flip-flop therein is set, providing a high signal condition to terminal 9 of character store block 902. This high signal condition is passed by way of leads 937 and 942 to one input of inverter gate 624. The storage of the next character sets flip-flop 920 in stage 19, providing a high signal condition to lead 932 which is connected by way of lead 943 to the other input terminal of inverter gate 624. This results in a low signal condition on the output of inverter gate 624, enabling the input set gate of SB flip-flop 626. Accordingly, the next clock pulse sets flip-flop 626, producing a high signal condition at the output set terminal.

The high signal condition at the output of set terminal of flip-flop 626 is applied by way of lead 627 to one input of inverter gate 537. The other input of inverter gate 537 is connected by way of lead 946 to terminal 4 of character store block 903. Since a character is stored in the 15th stage, terminal 4 is at the high signal condition due to the set condition of the marker flip-flop in the 15th stage. Accordingly, a low signal condition corresponding to ground is produced at the output of inverter gate 537.

Assuming that the 100-speed station originated the call, relay 1–CR is released, applying the low signal condition at the output of inverter gate 537 through break contacts of relay 1–CR, inverter 503 and break contacts of relay 1–CR to lead 504. Accordingly, a marking condition is maintained on lead 504 which, as previously described, extends to the input of the converter, precluding the reception of signals by the serial-to-parallel converter. If the 100-speed station is the terminating station, relay 1–CR is operated, as previously described, extending the marking condition at the output of inverter gate 537 through make contacts of relay 1–CR, inverter 511, and make contacts of relay 1–CR to lead 504. Accordingly, the input to the converter is maintained marking in a corresponding manner.

Returning now to the set condition of SB flip-flop 626, the low condition produced at the reset output terminal thereof is applied through lead 610 to inverter 540. This produces a positive-going transition at the output of inverter 540, which positive-going impulse is applied through capacitor 541 to the input of 100-speed break sender 524. As previously described, the application of a positive impulse to break sender 524 provides at the output thereof a low signal condition corresponding to a "break" signal. Accordingly, as previously described, a "break" signal is transmitted to the 100-speed station, momentarily forcing the operator to stop transmitting. It is noted that this low condition at the output of break sender 524 is also applied by way of lead 618 to inverter gate 617. This precludes the application of a low signal condition to the output of inverter gate 617 by multivibrator 616, whereby the "restraint" signal is blocked during the transmission of the "break signal."

During the transmission of the "break" signal, the low condition of the output of break sender 524 is also extended to lead 527 through diode 526. As previously described, the low condition on lead 527 is inverted by inverter 529 and normally provides the "off-normal" condition. With SB flip-flop 626 in the set condition, however, lead 610 is in the low condition, as previously described, which low condition is applied to the other input of inverter gate 530. This precludes the output of inverter gate 530 from going to the low condition, thus blocking the generation of the "off-normal" condition and precluding store erasure.

At the 100-speed station the reception of the "restraint" signal, together with the "break" signal, advises the operator that the buffer store at the converter is filled. The operator will then stop transmitting until the "restraint" signal is removed.

At the converter the characters will be continued to be read out of the buffer store. When stage 15 empties and the marker flip-flop therein is reset, the high signal condition is removed from lead 946 and inverter gate 537 thus removes the mark-hold condition from the input of the converter. Stage 14 next empties and the reset condition of the marker flip-flop therein applies a high signal condition to lead 944 which, in turn, extends to an input of inverter gate 625. When stage 13 empties, the reset of the marker flip-flop therein applies a high signal condition to lead 945 which, in turn, extends to the other input of inverter gate 625. This results in an enabling voltage on the input reset gate of flip-flop 626 whereby the flip-flop is reset by the next clock pulse. The subsequent clearing of buffer store stages 3 and 4 resets flip-flop 615, as previously described, removing the "restraint" signal. The circuit is thus restored to the normal condition.

*Forced disconnect*

Recalling now that SB flip-flop 626 is set to send a "store break" when the buffer store is filled, it is noted that the low condition at the reset output terminal thereof enables the input set gate of SD flip-flop 612. If the 100-speed operator does not receive the "restraint" and "store break" signals and thus continues to send, the reception of the next character applies a negative-going impulse to lead 350 which lead, as previously described, extends to the matrix. Lead 350 is connected to the pulsing input lead of the input set gate of flip-flop 612 whereby the flip-flop is set.

The setting of flip-flop 612 produces a low signal condition at the reset output terminal, which low signal condition is applied by way of diode 619 to inverter gate 617, thus blocking the "restraint" signal. The low condition signal also enables the input set gate of EOT flip-flop 611, whereby this flip-flop is set by the next clock pulse. The function of flip-flop 611 is described hereinafter. In addition, a high condition is provided at the output set terminal, which high condition is passed through lead 629 to inverter 538, FIG. 5. Inverter 538, in turn, provides a low condition to lead 518 and lead 518, in turn, extends to one input of inverter gate 411 and, by way of lead 412, to one input of inverter gate 414. As previously described, the application of a low input to inverter gate 411 results in a spacing tone at output terminal 1 of modulator 101. The application of a low condition to inverter gate 414 results in a spacing tone at output terminal 1 of modulator 401. Accordingly, a prolonged spacing signal is transmitted to both remote stations and, since this signal is maintained so long as SD flip-flop 612 is set, it is recognized as a disconnect request, whereby both remote stations disconnect. The operation of the disconnect sequence is described hereinafter. Accordingly, it is thus seen that if the 100-speed station does not respond to the "restraint" signal and the "store break" signal, indicating a signaling failure, both stations are disconnected.

*60-speed to 100-speed translation*

Figure 8:
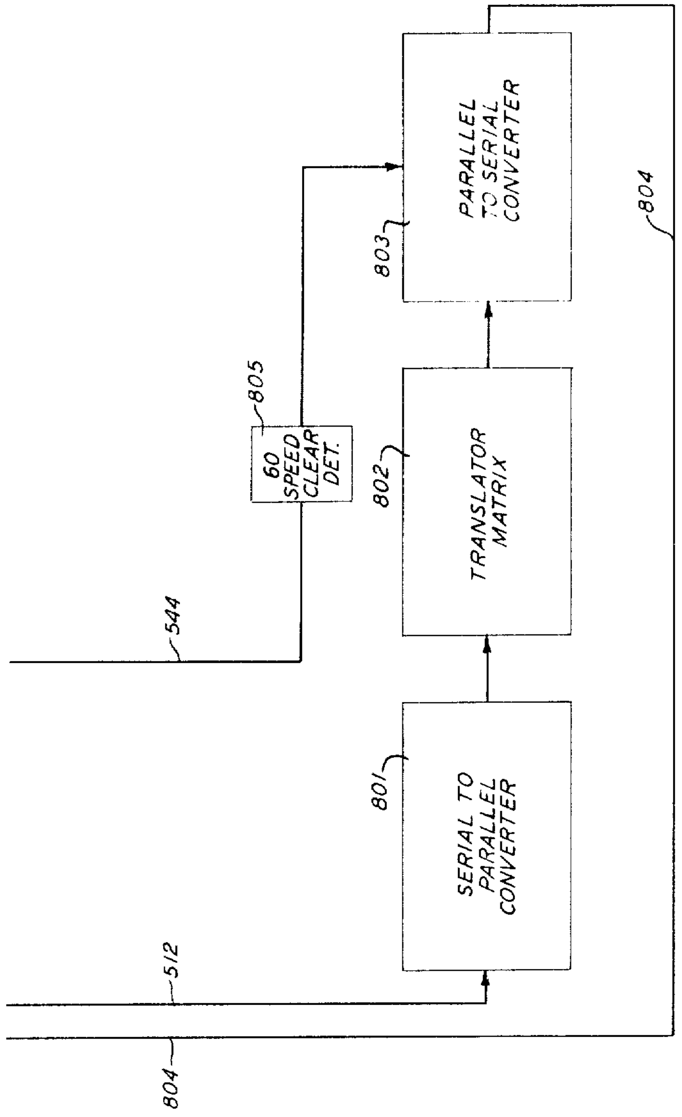

As previously described, high signal conditions corresponding to received marking signals and low signal conditions corresponding to received spacing signals from the 60-speed station are applied to lead 512 which, in turn, extends to the input of the 60-speed to 100-speed translator-converter, generally shown in FIG. 8. Tracing lead 512, it extends to the input of a serial-to-parallel converter, generally indicated by block 801. Serial-to-parallel converter 801 is similar to the 100-speed to 60-speed serial-to-parallel converter 212 and functions to convert the serially received 60-speed signals to parallel signals at the output thereof. The output of converter 801 extends to the input of a translator-matrix, generally indicated by block 802.

Translator-matrix 802 is generally similar to the 100-speed to 60-speed translator and matrix and functions to detect the 60-speed characters applied in parallel from thereto and converts them to corresponding characters in the 100-speed code. These 100-speed characters are then applied to parallel-to-serial converter 803 where they are converted to serial form and then applied to lead 804. Since the signals read out of translator-matrix 802 by serial-to-parallel converter 801 are at the 60-speed rate, it is apparent that a buffer storage is not required prior to retransmitting the signals to the 100-speed station.

Assuming that the 60-speed station originates the call, relay 1–CR is operated, as previously described. Accordingly, lead 804 extends to lead 520 by way of make contacts of relay 1–CR. The signals on lead 520 are then passed to modulator 401, as previously described, whereby they are transmitted out of terminal 1 thereof in the appropriate frequency tones. If the 60-speed station is terminating the call, relay 1–CR is released and lead 804 extends to lead 517 by way of break contacts of relay 1–CR. Accordingly, the serial signals are passed to modulator 101 through inverter gate 411 and then converted to appropriate frequency shift tones.

*End-of-transmission disconnect*

The remote 60-speed data set is arranged to terminate transmission by sending a "clear" signal comprising a prolonged spacing tone. After the conclusion of the "clear" signal, the 60-speed station then disconnects by restoring to the on-hook condition.

The signals received from the 60-speed station are applied to the input of diode 513 which diode extends to the input of break detector 514, as previously described. These signals are also applied to diode 543 which is connected in parallel to diode 513. Accordingly, when a marking signal is received, a low condition signal is passed through diode 543 and lead 544 to 60-speed clear detector 805 and, conversely, when a spacing signal is received the low signal condition input to clear detector 805 is removed.

60-speed detector 805 comprises a timing circuit which times out in response to the removal of the low signal condition for an interval corresponding to the interval of the "clear" signal. This provides a signal at the output of 60-speed detector 805 which is applied to parallel-to-serial converter 893, storing in converter 803 the end-of-transmisison code character. Accordingly, the end-of-transmission code character is passed to lead 804 and then on to the 100-speed station, as previously described.

If the 60-speed station originates the call, timer 202 also times out at the conclusion of the reception of the "clear" signal. This turns ON amplifier 203, as previously described, thereby providing operating ground through the make contacts of relay 2–CON, lead 207, back contacts of relay 5–CL, and the winding of relay 5–CL. Relay 5–CL thus operates and locks to ground by way of its own make contacts and the make contacts of relay 1–CP. With relay 5–CL operated, ground is applied to inverter 511 by way of make contacts of relay 5–CL and make contacts of relay 1–CR. This produces a high signal condition at the output of inverter 511 which condition is extended through make contacts relay 1–CR and lead 504 to the input of the 100-speed to 60-speed converter. Accordingly, a mark-hold condition is applied to the converter precluding the reception of signals from the 100-speed station.

At the conclusion of the "clear" signal, the 60-speed station disconnects, as previously described. Assuming that the 60-speed station originates the call, relay 1–CR is released by the telephone office in response to the disconnect. The release of relay 1–CR opens the operating path for relay 1–OS and the latter relay releases.

When the 100-speed station disconnects in response to the end-of-transmission character, the simplex ground across leads IT and IR is removed, releasing relay 4–SVP. With relay 4–SVP released, together with the release of relay 1–OS, the operating path for relay 1–CC is open, releasing the latter relay. In addition, the release of relay 4–SVP reconnects loop leads IT1 and IR1 to loop lead OT1 and OR1, as previously described. In addition, the release of relay 1–CC reconnects loop leads IT and IR to loop leads OT and OR. Relay 1–CC released also reapplies disabling ground to discriminator 407.

The release of relays 4–SVP and 1–OS opens the previously-described operating ground for relay 1–CP. The subsequent release of relay 1–CC opens the previously-described holding path for relay 1–CP and this relay now releases. Relay 1–CP released, in turn, opens the previously-described locking path for relay 2–CON and relay 5–CL and the two relays release.

The release of relay 1–CP removes enabling battery from modulator 101 and the release of relay 1–CON removes enabling battery from modulator 401. In addition, with relays 1–CR, 2–CON and 5–CL released, the switching control circuit for the translator-converter is restored to the initial condition. The converter is now prepared to receive, translate and retransmit signals for the next connection.

Assuming now that the 60-speed station terminated the call, timer 507 times out to operate relay 5–CL. Ground is now applied via the make contacts of relay 5–CL and the break contacts of relay 1–CR to inverter 503. Inverter 503, in turn, applies the mark-hold signal to lead 504, as previously described. The disconnection of the 60-speed station now removes simplex ground for relay 4–SVP and the relay releases, as previously described. The disconnection of the 100-speed station after the reception of the end-of-transmission character removes ground from lead 109 and relay 1–OS releases. With relay 4–SVP and relay 1–OS released, relay 1–CC releases, as previously described. This is followed by the release of relays 1–CP, 2–CON and 5–CL to restore the circuit to the initial idle condition in the same manner as previously described.

The 100-speed station terminates the call by sending the end-of-transmission code character and then restoring to the on-hook condition a short interval thereafter. At the converter, the end-of-transmission character is applied to translator 214 by way of serial-to-parallel converter 212, as previously described. Matrix 301 is thus energized, sending a pulse to buffer amplifier 312, whereby the low condition impulse is passed to lead 363. Lead 363, in turn, extends to the reset output lead of EOT flip-flop 611. Accordingly, in response to the end-of-transmission character, EOT flip-flop 611 is placed in the set condition. This results in a high condition signal at the set output terminal which high condition signal is passed by way of lead 630 to inverter 228 (FIG. 2). Consequently, a low condition signal is provided at the output of inverter 228 and applied to the input of amplifier 203. Accordingly, amplifier 203 provides operating ground to relay 5–CL, as previously described, operating the relay which locks by way of make contacts of relay 1–CP. With relay 5–CL operated, a mark-hold is applied to serial-to-parallel converter 212, as previously described.

If the 100-speed station had originated the call, upon the disconnect thereof relay 1–OS is released, as previously described. If the 100-speed station has terminated the call, upon the disconnect thereof, relay 4–SVP releases, as previously described, reconnecting loop leads IT1 and IR1 to loop leads OT1 and OR1.

During and after the reception of the end-of-transmission character, the buffer store continues to feed characters stored therein through the output circuit and the appropriate modulator to the 60-speed station. When the last of the characters are fed out of the buffer store, lead 1037 goes to the low condition, as previously described. This applies a low condition to the set input gate of SE flip-flop 750, FIG. 7. Accordingly, at the beginning of the next cycle of character timer 701, the positive-going transistion is inverted by inverter 719 and a negative-going impulse is applied through the input set gate of SE flip-flop 750. Thus, after all the characters are fed out of the buffer store, SE flip-flop 750 is set, providing at the reset output terminal thereof a low condition signal. This low condition signal is passed by way of lead 751 and make contacts of relay 5–CL to lead 534. Assuming that the 100-speed station has originated the call, relay 1–CR is released and lead 534 extends by way of break contacts of relay 1–CR and lead 521 to inverter gate 414. Accordingly, a high condition signal is applied by way of lead 413 to terminal 10 of modulator 401. This results in the transmitting of a spacing "clear" signal to the 60-speed station advising the station to disconnect.

If the 100-speed station had terminated the call, relay 1–CR is operated and lead 534 extends by way of make contacts of relay 1–CR and lead 519 to inverter gate 411. Accordingly, a high condition signal is applied by way of lead 412 to input terminal 10 of modulator 101, whereby a spacing "clear" signal is transmitted to the 60-speed station.

In response to the spacing "clear" signal, the 6-speed station disconnects, releasing relay 1–CR if it is an originating station and releasing relay 4–SVP if it is a terminating station. With the 100-speed station disconnected, this results in the sequential release of relays 1–CC and 1–CP, as previously described. The release of relays 2–CON and 5–CL therefore follow, restoring the converter circuit to the initial idle condition.

Although a specific embodiment has been shown and described, it will be understood that various modifications may be made without departing from the spirit of this invention and within the scope of the appended claims.

What is claimed is:

1. In a binary data signal communication system, a storage system for storing data signals received from a remote data set comprising, means for receiving said data signals from said data set, means for storing said data signals received by said receiving means, first signalling means for returning a warning signal to said remote data set, means responsive to the storage of a predetermined number of said data signals in said storing means for enabling said first signalling means, second signalling means for returning a different signal to said remote set to temporarily break transmission by said remote set, and further means responsive to the storage of an additional number of data signals in said storing means for enabling said second signalling means and disabling said first signaling means.

2. In a binary data signal communication system in accordance with claim 1 including additional means conditioned by said further means and thereafter operated in response to the subsequent reception of data signals by said receiving means for maintaining operated said second signaling means to terminate transmission by said remote set.

3. In a binary data signal communication system, a storage system for storing data signals received from a remote data set comprising, means for receiving said data signals from said data set, means for storing said data signals received by said receiving means, signaling means for returning a signal to said remote set to temporarily break transmission by said remote set, means responsive to the storage of a predetermined number of said data signals in said storing means for enabling said signaling means, and means conditioned by said enabling means and thereafter operated in response to the subsequent reception of data signals by said receiving means for maintaining operated said signaling means to terminate transmission by said remote set.

4. In a data signal communication system, a transmission channel, means for receiving data signals from said transmission channel, means for storing said data signals received by said receiving means, means for withdrawing said data signals stored in said storing means, means settable in response to the storage of a predetermined number of data signals in said storage means, signaling means responsive to the set condition of said settable means for impressing a signal on said transmission channel, means responsive to said withdrawing of said stored data signals from said storing means for resetting said settable means, and means responsive to the reception of data signals by said receiving means during the set condition of said settable means for impressing a signal on said transmission channel.

5. In a data signal communication system, a first transmission channel, a second transmission channel, means for receiving data signals from said first transmission channel, means for storing said data signals received by said receiving means, means for withdrawing said data signals stored in said storing means, transmitting means for applying said withdrawn data signals to said second transmission channel, first signalling means responsive to the storage of a predetermined number of data signals in said storage means for impressing a first signal on said first transmission channel, means settable in response to the storage of data signals in excess of said predetermined number, second signaling means responsive to the set condition of said settable means for impressing a second signal on said first transmission channel, and means responsive to said withdrawing of said stored data signals from said storing means for resetting said settable means.

6. In a data signal communication system, a first transmission channel, a second transmission channel, means for receiving data signals from said first transmission channel, means for storing said data signals received by said receiving means, means for withdrawing said data signals stored in said storing means, transmitting means for applying said withdrawn data signals to said second transmission channel, first signaling means responsive to the storage of a predetermined number of data signals in said storage means for impressing a first signal on said first transmission channel, means settable in response to the storage of data signals in excess of said predetermined number, second signaling means responsive to the set condition of said settable means for impressing a second signal on said first transmission channel, means responsive to said withdrawing of said stored data signals from said storing means for resetting said settable means, and means reponsive to the reception of data signals by said receiving means during the set condition of said settable means for applying a signal to said transmitting means and impressing a third signal on said first transmission channel.

7. In a data transmission system, a buffer store for storing data signals received from a first station and retransmitting said signals to a second station comprising, a plurality of sequential storage means, each of said storage means capable of storing a data signal, means for removing data signals stored in an initial one of said storage means, means for transmitting signals to said second station in accordance with said removed data signals, means for receiving data signals from said first station, means for storing each of successive data signals received by said receiving means in corresponding successive storage means starting with said initial storage means and other means for advancing each of said stored successive data signals to the next one of said successive storage means as each data signal is removed from said initial storage means, means enabled by the storage of a data signal in a predetermined one of said storage means for sending a warning signal to said first station, and means responsive to said enabled means and the subsequent reception of a data signal by said receiving means for sending a disconnect signal to said second station.

8. In a binary data signal communication syster means for receiving data signals, means for transmitting data signals at a predetermined rate, a plurality of sequential storage means, each of said storage means capable of storing a data signal, means for storing in an initial one of said storage means data signals received by said receiving means, means for applying to said transmitting means at said predetermined rate data signals stored in a final one of said storage means, means for shifting said data signals stored in said initial storage means toward said final storage means through storage means intermediate thereto at a rate exceeding said predetermined rate, means responsive to the storage of a data signal in any one of said storage means for maintaining the storage of a data signal in the storage means prior thereto, means settable in response to said maintained storage of a data signal in a predetermined one of said intermediate storage means, and means responsive to the reception of a data signal by said receiving means during the set condition of said settable means for applying a signal to said transmitting means.

9. In a binary data signal communication system, means for receiving data signals, means for transmitting data signals at a predetermined rate, a plurality of sequential storage means, each of said storage means capable of storing a data signal, means for storing in an initial one of said storage means said data signals received by said receiving means, means for applying to said transmitting means at said predetermined rate data signals stored in a final one of said storage means, means for shifting said data signals stored in said initial storage means toward said final storage means through storage means intermediate thereto at a rate exceeding said predetermined rate, means responsive to the storage of a data signal in any one of said storage means for maintaining the storage of a data signal in the storage means prior thereto, means settable in response to said maintained storage of a data signal in a predetermined one of said intermediate storage means for disabling said receiving means, means effective in the absence of the storage of a data signal in a storage means prior to said one intermediate storage means for re-enabling said receiving means, means effective in the absence of the storage of a data signal in a storage means prior to said prior storage means for resetting said settable means, and means responsive to the reception of a data signal by said receiving means during the set condition of said settable means for applying a disconnect signal to said transmitting means.

10. In a binary data transmission system, a first communication channel, a second communication channel, means for receiving data signals from said first channel, means for storing said data signals received by said receiving means, transmitting means for transmitting signals to said second channel, means for applying signals to said transmitting means, means operated by said transmitting means for shifting data signals stored in said storing means to said applying means, detecting means responsive to the reception of a predetermined signal from said second channel, and means responsive to said detecting means for disabling said applying means and operating said shifting means whereby said stored signals are discarded.

11. In a binary data transmission system, a first communication channel, a second communication channel, means for receiving data signals from said first channel, a plurality of sequential storage means, each of said storage means capable of storing a data signal, means for storing said data signals received by said receiving means in an initial one of said storage means, continuously operating means for shifting said data signals stored in said initial storage means to a final one of said storage means by way of storage means intermediate thereto, transmitting means for transmitting signals to said second channel, means for applying signals to said transmitting means, other means operated by said transmitting means for shifting data signals stored in said final storage means to said applying means, detecting means responsive to the reception of a predetermined signal from said second channel, and means responsive to said detecting means for disabling said applying means and operating said other means whereby said stored signals are discarded.

References Cited by the Examiner

UNITED STATES PATENTS 2,951,233 8/1960 Tanco ____________ 340—172.5

ROBERT C. BAILEY, *Primary Examiner.*

M. LISS, *Assistant Examiner.*